United States Patent
Shibamiya et al.

(10) Patent No.: US 7,620,969 B2
(45) Date of Patent: Nov. 17, 2009

(54) PROGRAM INFORMATION DISPLAY CONTROL APPARATUS AND METHOD, REMOTE CONTROL DEVICE, PROGRAM, AND STORAGE MEDIUM

(75) Inventors: Yoshikazu Shibamiya, Tokyo (JP); Shigeki Mori, Saitama (JP); Yuichi Matsumoto, Kanagawa (JP); Masaki Kutsuna, Toyota (JP); Tetsu Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 10/729,937

(22) Filed: Dec. 9, 2003

(65) Prior Publication Data

US 2004/0148629 A1 Jul. 29, 2004

(30) Foreign Application Priority Data

Dec. 13, 2002 (JP) ............................. 2003-363113

(51) Int. Cl.
*H04N 5/445* (2006.01)
(52) U.S. Cl. .............................. 725/52; 725/39; 725/47
(58) Field of Classification Search .................. 725/53, 725/40, 39, 52, 45
See application file for complete search history.

(56) References Cited

U.S. PATENT DOCUMENTS

| 5,808,608 | A | * | 9/1998 | Young et al. ................... 725/52 |
| 6,133,962 | A | * | 10/2000 | Proehl et al. .................... 725/44 |
| 6,166,778 | A | | 12/2000 | Yamamoto et al. ........... 348/569 |
| 6,392,709 | B1 | | 5/2002 | Orito .......................... 348/569 |
| 2001/0011373 | A1 | * | 8/2001 | Inoue ........................... 725/50 |
| 2002/0021373 | A1 | | 2/2002 | Shibamiya ............... 348/734 I |
| 2002/0044144 | A1 | * | 4/2002 | Inoue ........................... 345/204 |
| 2002/0063797 | A1 | | 5/2002 | Aratani et al. .............. 348/553 |
| 2002/0124256 | A1 | | 9/2002 | Suzuka ......................... 725/55 |
| 2002/0138829 | A1 | | 9/2002 | Matsumoto et al. ........... 725/14 |
| 2003/0036603 | A1 | | 2/2003 | Hasegawa et al. ........... 525/107 |
| 2004/1009361 | | * | 5/2004 | Johnson ....................... 725/53 |
| 2005/1023532 | | * | 10/2005 | Maze et al. .................... 725/52 |

FOREIGN PATENT DOCUMENTS

| JP | 9-270969 | 10/1997 |
| JP | 10-42218 | 2/1998 |
| JP | 11-155110 | 6/1999 |
| JP | 11-196343 | 7/1999 |
| JP | 2000-313878 | 11/2001 |
| JP | 2001-313878 | 11/2001 |
| JP | 2002-300492 | 10/2002 |
| JP | 2003-92712 | 3/2003 |

* cited by examiner

*Primary Examiner*—Brian T Pendleton
*Assistant Examiner*—Jason K Lin
(74) *Attorney, Agent, or Firm*—Fitzpatrick, Cella, Harper & Scinto

(57) ABSTRACT

This invention provides a program information display control apparatus and method, a remote control device, a program, and a storage medium, which can simultaneously display the contents and detailed information of specific programs that follow predetermined rules such as a time band, genre, and the like. To this end, detailed program information associated with each of programs to be displayed on an EPG is acquired from an antenna (1101) and tuner (1102). The acquired program information is stored in a memory (1150) via a decoder (1103). A viewer designates programs, details of which are to be displayed, using a remote controller (12), and the memory (1150) is searched for detailed program information of a plurality of designated programs. An image controller (1121) simultaneously displays a plurality of pieces of program information associated with these designated programs at their display positions on the EPG displayed on a display unit (1122).

6 Claims, 21 Drawing Sheets

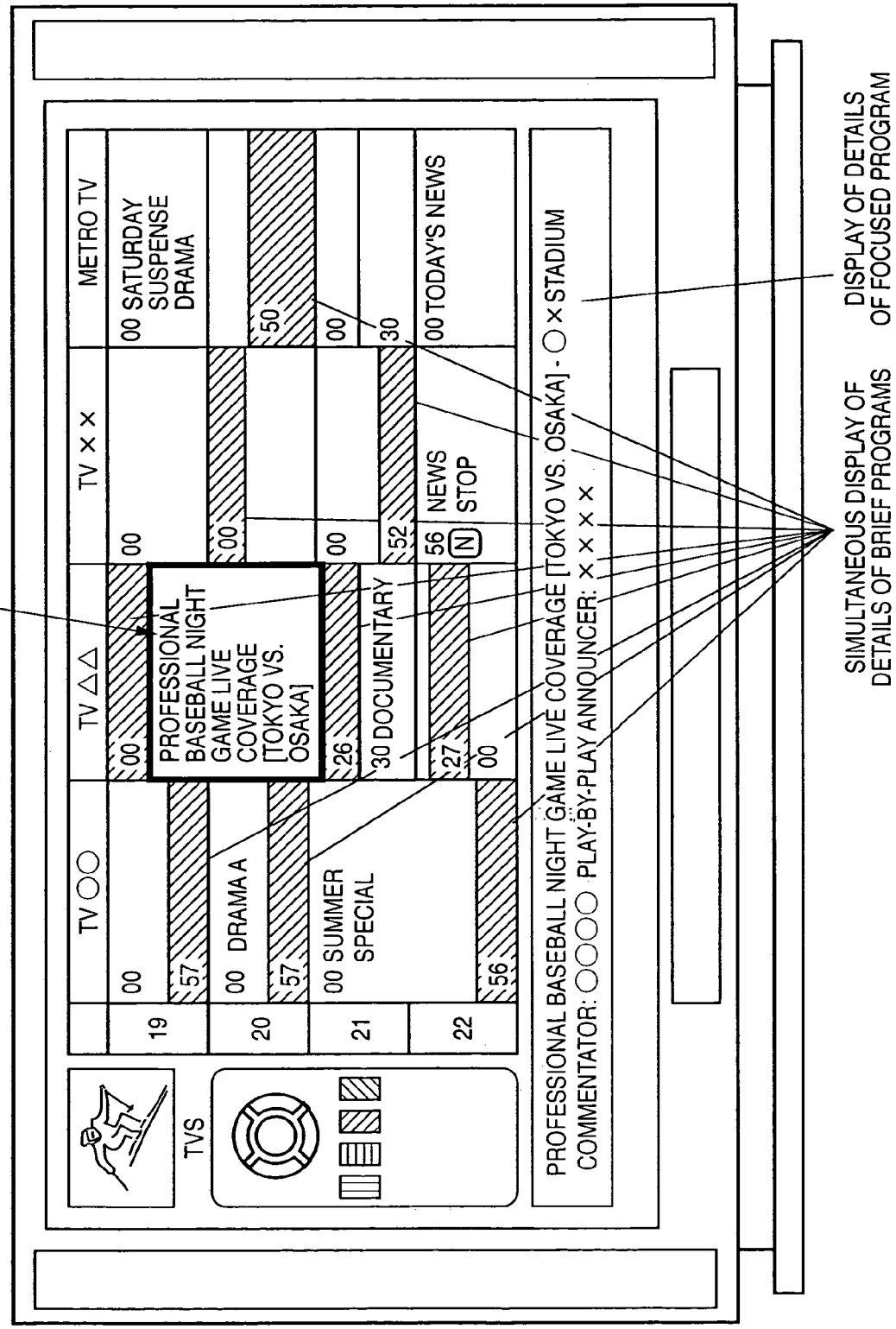

FIG. 8A

| | TV ○○ | TV △△ | TV ×× | METRO TV | |
|---|---|---|---|---|---|
| 19 | 00 | 00 | 00 | 00 SATURDAY SUSPENSE DRAMA | 81 |
| 20 | 00 DRAMA A | 03 PROFESSIONAL BASEBALL NIGHT GAME LIVE COVERAGE [TOKYO VS.OSAKA] | 03 DRAMA B | |
| 21 | 00 SUMMER SPECIAL | | 00 | 00 | |
| | | 30 DOCUMENTARY | | 30 | |
| 22 | | 00 | 56 NEWS (N) STOP | 00 TODAY'S NEWS | |

⇩ DEPRESSION OF RIGHT CURSOR KEY

| | TV ○○ | TV △△ | TV ×× | METRO TV | |
|---|---|---|---|---|---|
| 19 | 00 | 00 | 00 | 00 SATURDAY SUSPENSE DRAMA | 82 |
| 20 | 00 DRAMA A | 03 PROFESSIONAL BASEBALL NIGHT GAME LIVE COVERAGE [TOKYO VS.OSAKA] | 03 DRAMA B | |
| 21 | 00 SUMMER SPECIAL | | 00 | 00 | |
| | | 30 DOCUMENTARY | | 30 | |
| 22 | | 00 | 56 NEWS (N) STOP | 00 TODAY'S NEWS | |

⇩ DEPRESSION OF DOWN CURSOR KEY

| | TV ○○ | TV △△ | TV ×× | METRO TV | |
|---|---|---|---|---|---|
| 19 | 00 | 00 | 00 | 00 SATURDAY SUSPENSE DRAMA | 83 |
| 20 | 00 DRAMA A | 03 PROFESSIONAL BASEBALL NIGHT GAME LIVE COVERAGE [TOKYO VS.OSAKA] | 03 DRAMA B | |
| 21 | 00 SUMMER SPECIAL | | 00 | 00 | |
| | | 30 DOCUMENTARY | | 30 | |
| 22 | | 00 | 56 NEWS (N) STOP | 00 TODAY'S NEWS | |

⇩ DEPRESSION OF LEFT CURSOR KEY         TO FIG. 8B

FIG. 8B

FROM FIG. 8A

⇩ DEPRESSION OF LEFT CURSOR KEY

| | TV ○○ | TV △△ | TV × × | METRO TV | 84 |
|---|---|---|---|---|---|
| 19 | 00 | 00 | 00 | 00 SATURDAY SUSPENSE DRAMA | |
| 20 | 00 DRAMA A | 03 PROFESSIONAL BASEBALL NIGHT GAME LIVE COVERAGE [TOKYO VS.OSAKA] | 03 DRAMA B | | |
| 21 | 00 SUMMER SPECIAL | | 00 | 00 | |
| | | 30 DOCUMENTARY | | 30 | |
| 22 | | 00 | 56 NEWS (N) STOP | 00 TODAY'S NEWS | |

⇩ DEPRESSION OF LEFT CURSOR KEY

| | TV ○○ | TV △△ | TV × × | METRO TV | 85 |
|---|---|---|---|---|---|
| 19 | 00 | 00 | 00 | 00 SATURDAY SUSPENSE DRAMA | |
| 20 | 00 DRAMA A | 03 PROFESSIONAL BASEBALL NIGHT GAME LIVE COVERAGE [TOKYO VS.OSAKA] | 03 DRAMA B | | |
| 21 | 00 SUMMER SPECIAL | | 00 | 00 | |
| | | 30 DOCUMENTARY | | 30 | |
| 22 | | 00 | 56 NEWS (N) STOP | 00 TODAY'S NEWS | |

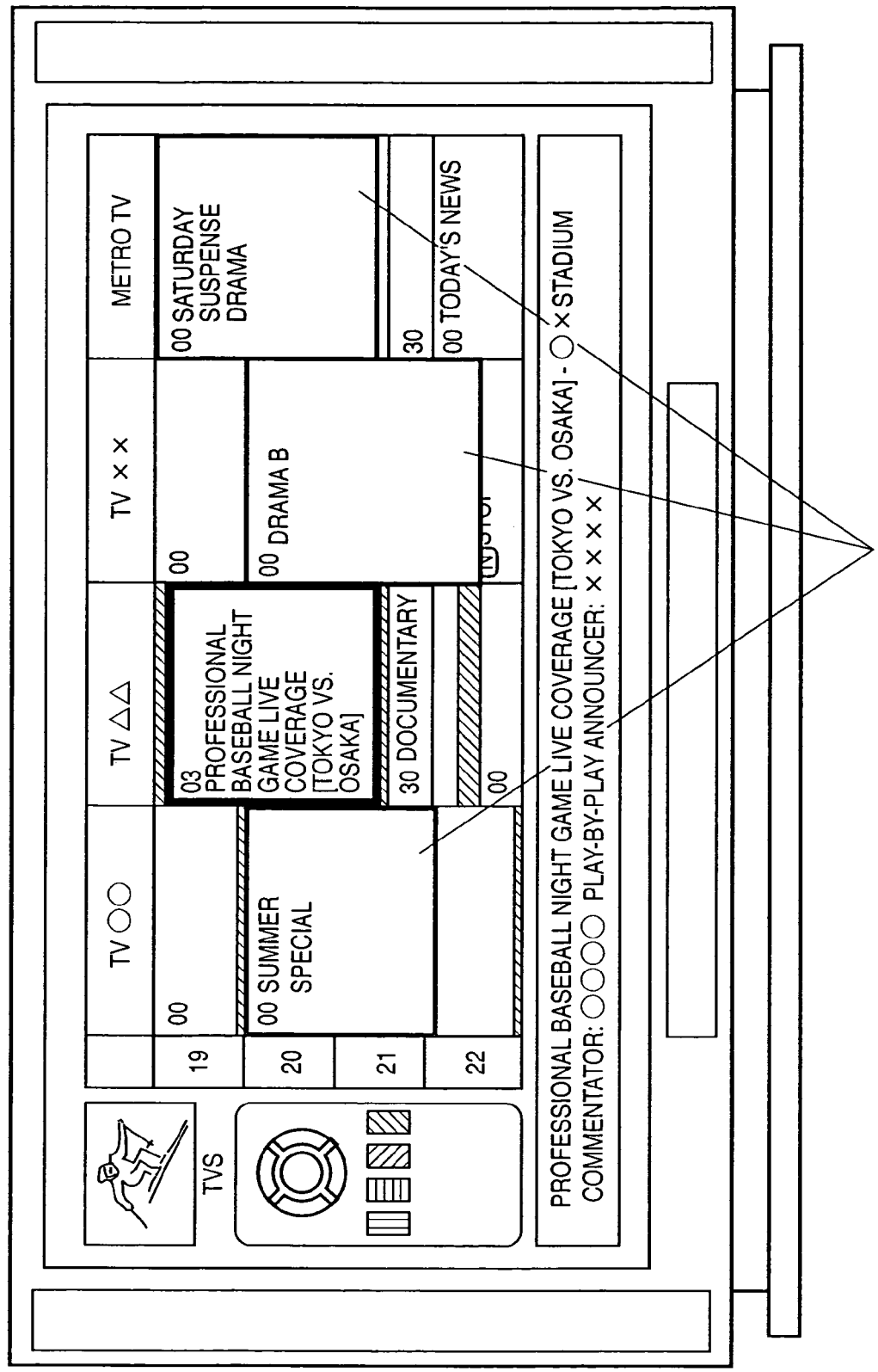

FIG. 16

|     | TV ○○ | TV △△ | TV ×× | METRO TV |
|-----|-------|-------|-------|----------|
| 19  | 00    | 03 PROFESSIONAL BASEBALL | 00 | 00 SATURDAY SUSPENSE DRAMA |
| 20  | 00 DRAMA A | | 03 DRAMA B | |
| 21  |       | 30    |       | 30 |
| 22  |       | 00 DOCUMENTARY | | 00 TODAY'S NEWS |

~161

⇩ DEPRESSION OF RIGHT CURSOR KEY

|     | TV ○○ | TV △△ | TV ×× | METRO TV |
|-----|-------|-------|-------|----------|
| 19  | 00    | 03 PROFESSIONAL BASEBALL | 00 | 00 SATURDAY SUSPENSE DRAMA |
| 20  | 00 DRAMA A | | 03 DRAMA B | |
| 21  |       | 30    |       | 30 |
| 22  |       | 00 DOCUMENTARY | | 00 TODAY'S NEWS |

~162

⇩ DEPRESSION OF DOWN CURSOR KEY

|     | TV ○○ | TV △△ | TV ×× | METRO TV |
|-----|-------|-------|-------|----------|
| 19  | 00    | 03 PROFESSIONAL BASEBALL | 00 | 00 SATURDAY SUSPENSE DRAMA |
| 20  | 00 DRAMA A | | 03 DRAMA B | |
| 21  |       | 30    |       | 30 |
| 22  |       | 00 DOCUMENTARY | | 00 TODAY'S NEWS |

163

⇩ DEPRESSION OF DOWN CURSOR KEY

|     | TV ○○ | TV △△ | TV ×× | METRO TV |
|-----|-------|-------|-------|----------|
| 19  | 00    | 03 PROFESSIONAL BASEBALL | 00 | 00 SATURDAY SUSPENSE DRAMA |
| 20  | 00 DRAMA A | | 03 DRAMA B | |
| 21  |       | 30    | 00    | 30 |
| 22  |       | 00 DOCUMENTARY | | 00 TODAY'S NEWS |

~164

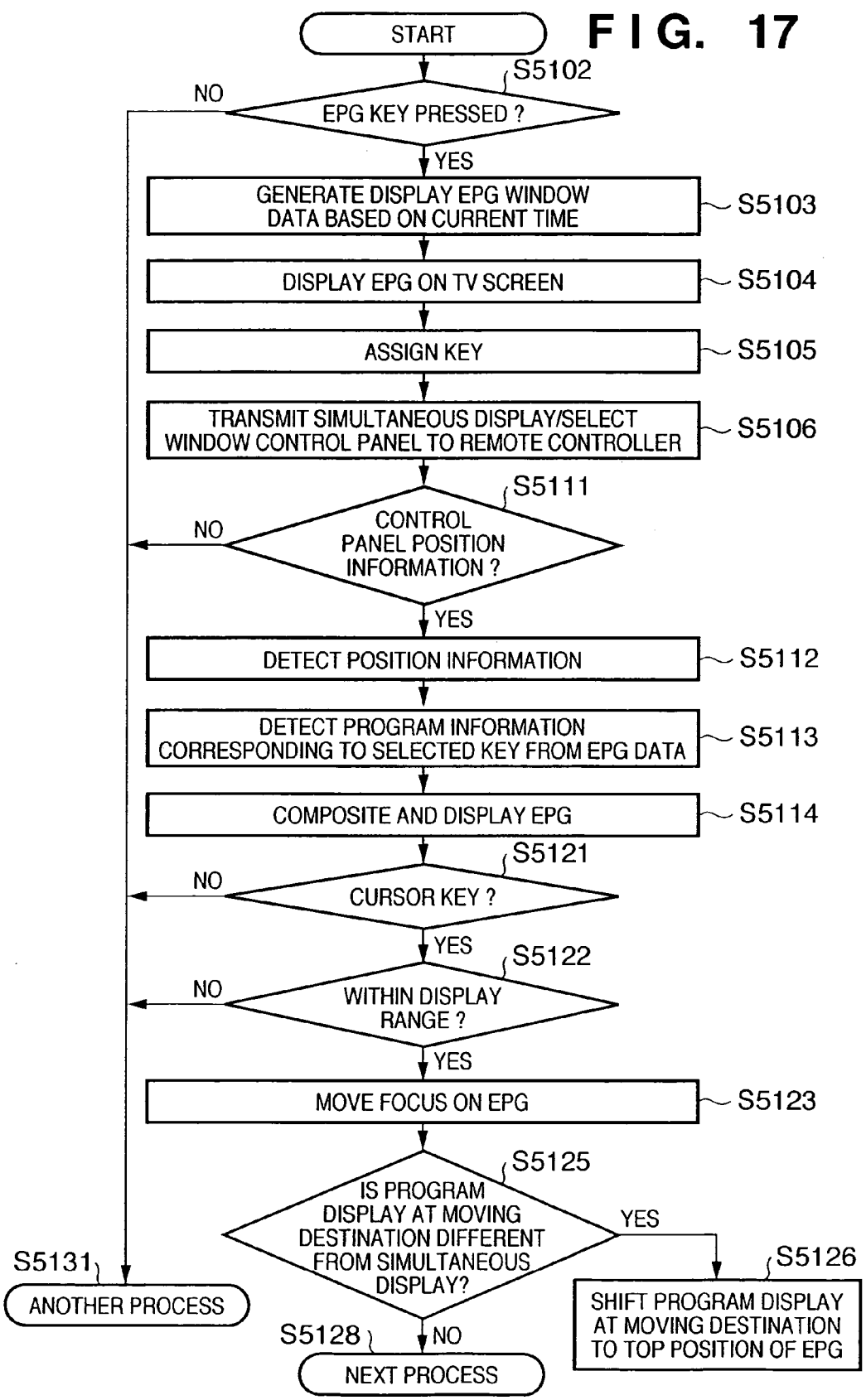

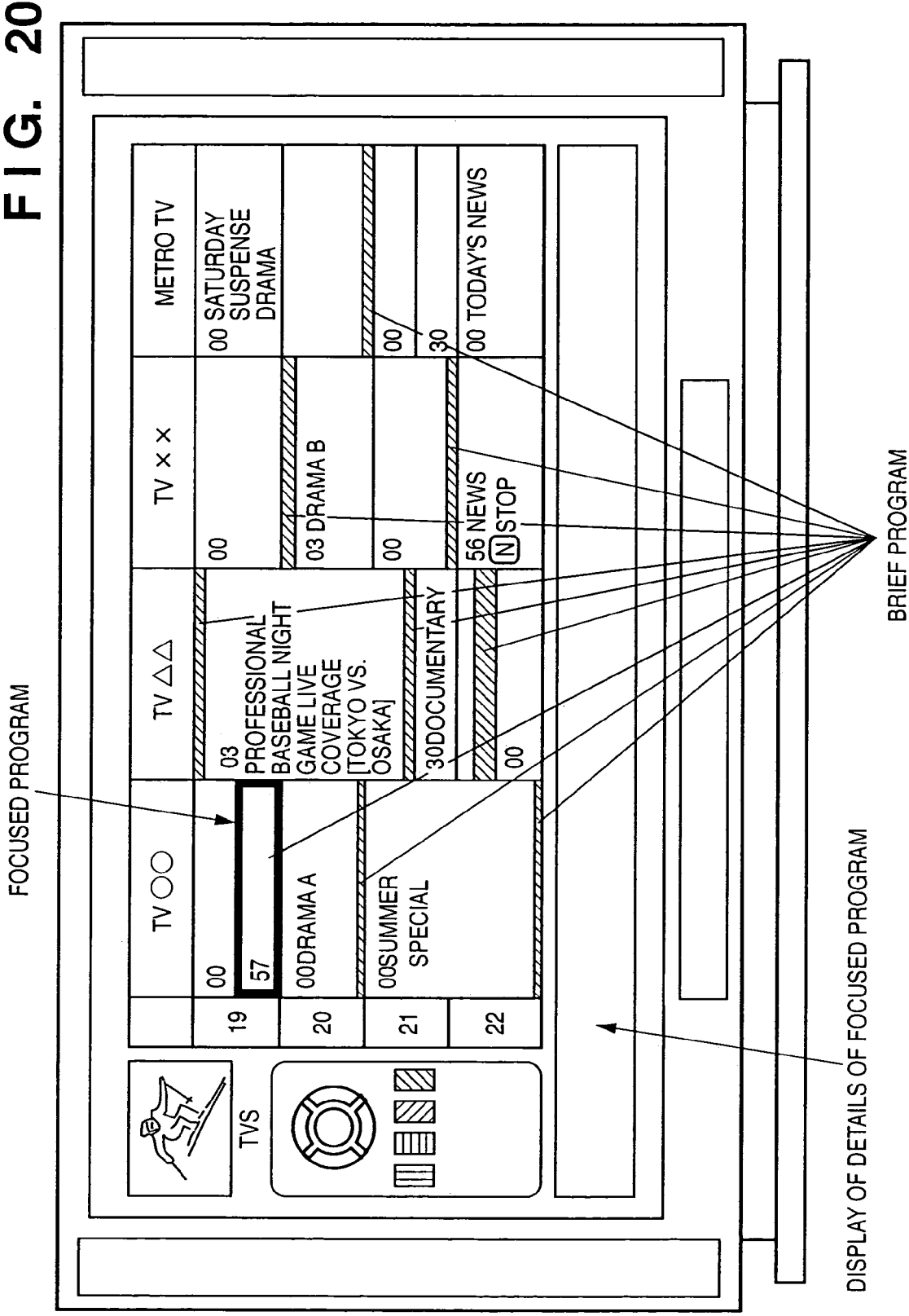

PROGRAM INFORMATION DISPLAY CONTROL APPARATUS AND METHOD, REMOTE CONTROL DEVICE, PROGRAM, AND STORAGE MEDIUM

FIELD OF THE INVENTION

The present invention relates to a technique for displaying an electronic program guide (to be abbreviated as "EPG" hereinafter).

BACKGROUND OF THE INVENTION

In recent years, upon the start of digital broadcast, prevalence of the Internet, marriage of televisions and computers, and the like, television viewers often display an EPG on a television screen or the like, watch programs, set timer recording of programs, and so forth.

Note that the electronic program guide (EPG) displays program contents of some channels in a given time band using data (EPG data) associated with programs such as titles of broadcast programs, sub-titles, genres, casts, comments, and the like on a matrix like a television section of newspapers and the like, as shown in FIG. 20. FIG. 20 shows an example of a conventional EPG which is displayed on the television screen and includes brief programs. In order to make the EPG shown in FIG. 20 more convenient for viewers, it is desirable to display data of all channels for a longer time band at one time.

On the other hand, the number of channels and the time band that can be displayed at one time are limited due to the resolution of the television screen, text legibility, and the like at the present moment. Therefore, in order to display program information as much as possible within such limitations, a sufficient display space cannot be assured for a brief program for about several minutes. For this reason, the conventional EPG adopts a display method of displaying only color bars (indicated by hatching in FIG. 20 for the sake of simplicity) displayed in specific color so as to make viewers recognize the presence of such brief programs.

In order to confirm the contents of a program that a viewer might want to watch, he or she focuses on the "color bar" that indicates a given brief program using cursor keys, thus displaying the program contents of that portion as a popup or displaying the program contents on a detailed information area on the lower portion of the screen. In addition, a method that allows the viewer to easily recognize programs by color-coding the programs in correspondence with genres upon displaying an EPG is known (e.g., Japanese Patent Laid-Open No. 11-196343).

However, it is very troublesome to focus on each brief program in the displayed EPG to display its contents as a popup so as to confirm the contents, and the original feature of the EPG that allows a viewer to simultaneously confirm the contents of various programs is not sufficiently utilized. The same applies to the method of Japanese Patent Laid-Open No. 11-196343.

In another method, a space for at least one line may be assured to display the contents of each brief program. However, with this method, the display space for other programs is reduced. Furthermore, only program titles can be displayed even for programs, whose contents are displayed, other than brief programs, and the viewer must confirm the detailed contents on the detailed information display area or the like by shifting a focus to a program that he or she wants to watch using the cursor keys or the like as in the brief programs.

As described above, in the conventional EPG display, the viewer must make a focus operation by moving a cursor or the like to confirm a program title and detailed contents, and cannot simultaneously confirm detailed contents of a plurality of programs. Hence, the original feature of the EPG cannot be sufficiently utilized.

SUMMARY OF THE INVENTION

The present invention has been proposed to solve the conventional problems, and has as its objects to provide a program information display control apparatus and method, a remote control device, a program, and a storage medium, which can make control required to simultaneously display the contents and detailed information of specific programs that follow given rules such as a time band, genre, and the like while maintaining the number of channels, time band, and the like of programs to be simultaneously displayed to be equivalent to those of the conventional EPG.

In order to solve the above problems, according to the present invention, a program information display control apparatus for controlling display means that displays an electronic program guide, comprises:

information acquisition means for acquiring program information associated with each of programs to be displayed on the electronic program guide;

display control means for controlling the display means to display the acquired program information; and search means for searching for a program according to a predetermined condition, wherein the display control means has a first mode for displaying the program information associated with the program in the form of the electronic program guide, and a second mode for displaying the program information associated with the program found by the search means by increasing a program information volume to be larger than a program information volume displayed in the first mode.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 shows an example of a composite EPG window upon simultaneously displaying 5-minute program titles on the television apparatus 11 according to the first embodiment of the present invention;

FIGS. 8A and 8B show examples of transition of a focus upon operation of cursor keys on the composite EPG window that simultaneously displays 5-minute program titles;

FIG. 15 shows an example of an EPG display window on the television apparatus 111 upon depression of a "drama" button on the EPG details simultaneous display/select control panel;

FIG. 16 shows an example of transition of a focus upon operation of cursor keys on a composite EPG window which simultaneously displays "drama" programs;

FIG. 17 is a flow chart for explaining the detailed operation of the television apparatus 111 according to the second embodiment of the present invention;

FIG. 20 shows an example of a conventional EPG including brief programs, which is displayed on the television screen.

DETAILED DESCRIPTION OF THE PREFERRED EMBODIMENTS

Preferred embodiments of the present invention will now be described in detail in accordance with the accompanying drawings.

First Embodiment

Figure 1:
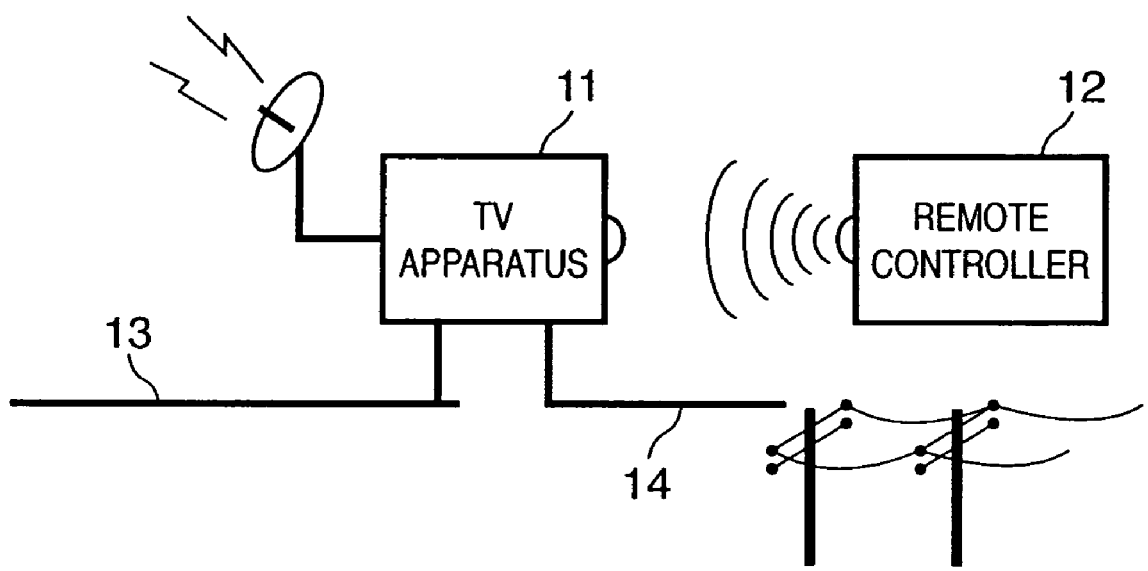
FIG. 1 is a schematic view showing the overall EPG display system including an EPG-compatible television apparatus according to the first embodiment of the present invention.

FIG. 1 is a schematic view showing the overall EPG display system which includes an EPG-compatible television apparatus according to the first embodiment of the present invention. As shown in FIG. 1, reference numeral 11 denotes a television apparatus which can receive digital broadcast. Reference numeral 12 denotes a remote controller used to remote-control the television apparatus 11. The remote controller 12 allows a television viewer to make various operations such as control, operations, data inputs, and the like of the television apparatus 11. The television apparatus 11 is connected to a network 13 and telephone line 14. The television apparatus 11 receives digital television broadcast, exchanges information with the remote controller 12, exchanges data with a device connected to the network 13 or the like, controls such device, and so forth. The television apparatus 11 displays television image data, device image data, EPG data, control information, and the like obtained via these operations on the screen.

Figure 2:
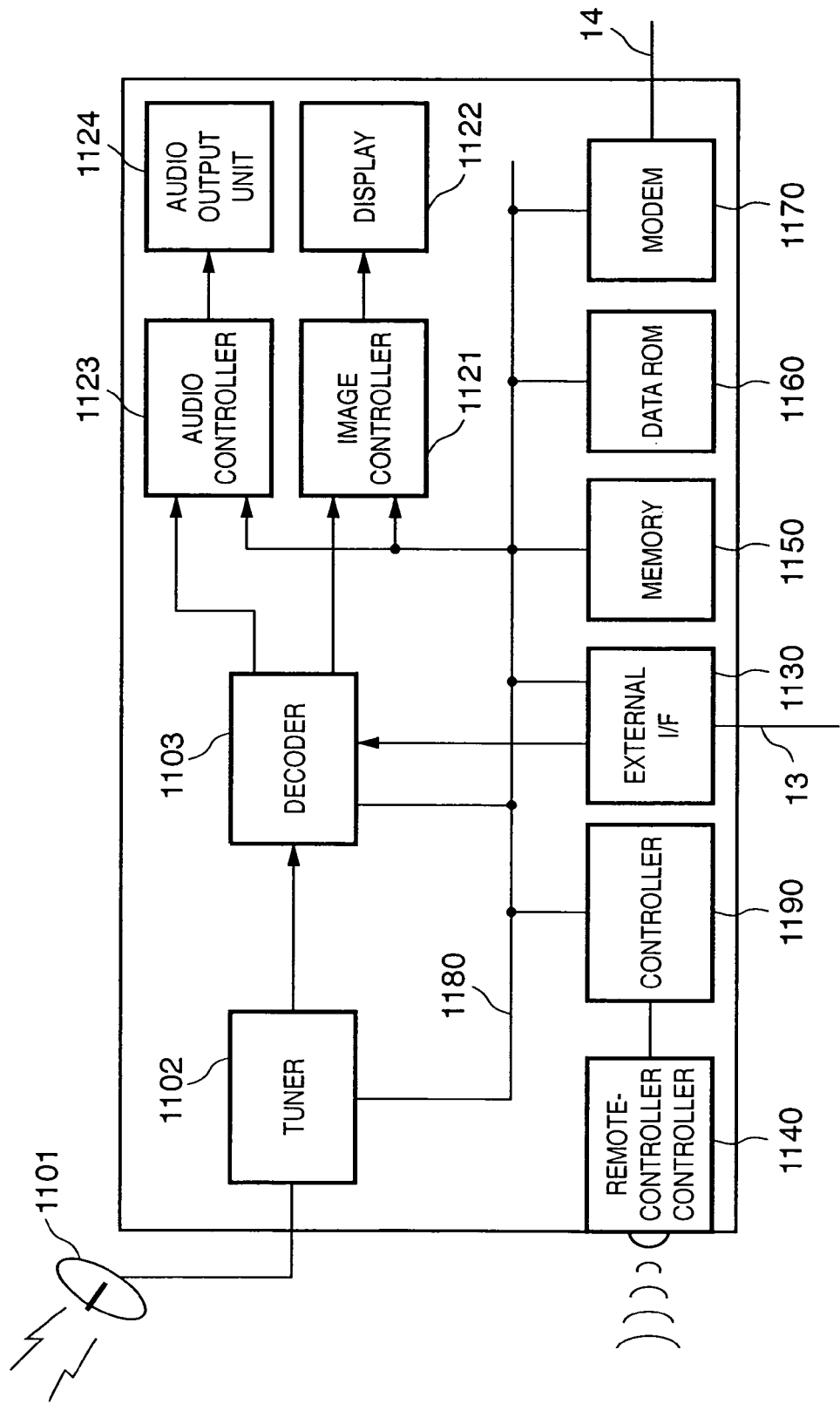
FIG. 2 is a block diagram showing the detailed arrangement of a television apparatus 11 according to the first embodiment of the present invention.

FIG. 2 is a block diagram showing the detailed arrangement of the television apparatus 11 according to the first embodiment of the present invention.

As shown in FIG. 2, reference numeral 1101 denotes an antenna, which receives an external television wave, converts it into an RF electric signal, and supplies that signal to a tuner 1102. The tuner 1102 amplifies the RF television signal supplied from the antenna 1101, tunes a required station, demodulates the RF television signal modulated by a carrier wave, and outputs the demodulated signal to a decoder 1103.

The decoder 1103 separates the signal obtained from the tuner 1102 into image data, audio data, and other data (e.g., additional data such as broadcast data, EPG data, and the like), and decodes these data. The image data is output to an image controller 1121, the audio data is output to an audio controller 1123, and other data are output onto an internal bus 1180.

The image controller 1121 outputs display image data (RGB image data) obtained by selecting or compositing image data output from the decoder 1103 and image data obtained via the internal bus 1180, and horizontal and vertical sync signals to a display unit 1122. The display unit 1122 receives the RGB image data and horizontal and vertical sync signals output from the image controller 1121, and displays an image on the television screen.

The audio controller 1123 selects or mixes audio data output from the decoder 1103 and audio data obtained via the internal bus 1180, or controls the tone volume, audio quality, presence, and the like, and outputs the audio data to an audio output unit 1124. The audio output unit 1124 amplifies an audio signal input from the audio controller 1123, and outputs a sound via a loudspeaker.

Reference numeral 1130 denotes an external I/F, which exchanges data with various external AV apparatuses, a personal computer, and the like via the network 13 and the like. Reference numeral 1140 denotes a remote-controller controller which receives various data transmitted when the television viewer operates the remote controller 12, and transfers the received data to a controller 1190.

Reference numeral 1150 denotes a memory which receives EPG data and various television broadcast additional data output from the decoder 1103, various data input via the external I/F 1130, and the like via the internal bus 1180, and stores these data.

Reference numeral 1160 denotes a data ROM, which stores data installed in advance in the television apparatus 11 such as character (font) data used in a display process, print process, and the like, image data such as icons and buttons used to display an EPG, and the like.

Reference numeral 1170 denotes a modem, which is used when the television apparatus 11 exchanges data with an external device via the telephone line 14. For example, the modem 1170 is used to transmit viewing information to a management server so as to pay an amount for viewing of pay broadcast, to exchange data with a broadcast station upon viewing interactive broadcast, to establish connection to a provider so as to browse the Internet, and so forth.

The controller 1190 is connected to the internal bus 1180, and systematically controls the aforementioned units in the television apparatus 11. For example, upon receiving television broadcast, the controller 1190 controls the aforementioned antenna 1101, tuner 1102, and decoder 1103 to make setups and control of switching of a channel, saving of data broadcast data and EPG data, and the like. Also, the controller 1190 controls the image controller 1121 to make display setups and control such as selection, composition, and the like of image data from the decoder 1103, data broadcast data, EPG data, and image data from the external I/F 1130.

Furthermore, the controller 1190 controls the audio controller 1123 to make mixing and output control of audio data input from the respective units. The controller 1190 interprets key code data from the remote controller 12, which is received by the remote-controller controller 1140, and executes a process according to the received key code data. The controller 1190 has a timepiece function of measuring the year, month, day, day of the week, time, and the like, and can manage and display a day of the week, time, and the like.

The internal bus 1180 interconnects the respective units in the television apparatus 11, as shown in FIG. 2, and is used to transfer image data, audio data, and the like and also to transfer information among the respective units.

More specifically, a program information display control apparatus (e.g., the television apparatus 11) according to this embodiment comprises the display unit 1122 for displaying an EPG. The apparatus acquires detailed program information associated with programs to be displayed on the EPG from the antenna 1101 and tuner 1102. The acquired program information is stored in the memory 1150 via the decoder 1103. A program, details of which are to be displayed is designated by the remote controller 12 via the remote-controller controller 1140, and the memory 1150 is searched for detailed program information associated with the designated program. The image controller 1121 displays the retrieved detailed program information associated with the designated program at its display position on the EPG displayed by the display unit 1122. When a plurality of programs are designated, and program information associated with each of these programs is retrieved, the image controller 1121 simultaneously displays a plurality of pieces of retrieved program information on the EPG.

Also, programs, details of which are to be displayed on the program information display control apparatus (e.g., the television apparatus 11) according to this embodiment are designated from the remote controller 12 by acquiring conditions of programs, details of which are to be displayed, and searching the EPG for the programs, details of which are to be displayed on the basis of the acquired conditions.

Furthermore, the program information display control apparatus (e.g., the television apparatus 11) according to this embodiment displays detailed program information of user's choice by designating a select direction of the next information from the display position of the currently selected detailed program information of a plurality of pieces of detailed program information, which are simultaneously displayed on the EPG, and selecting only detailed program information which is located in the designated direction and is closest to the display position of the currently selected detailed program information on the EPG. Note that the detailed operation sequence and the like of the program information display control apparatus (e.g., the television apparatus 11) according to this embodiment will be described later.

Figure 3:
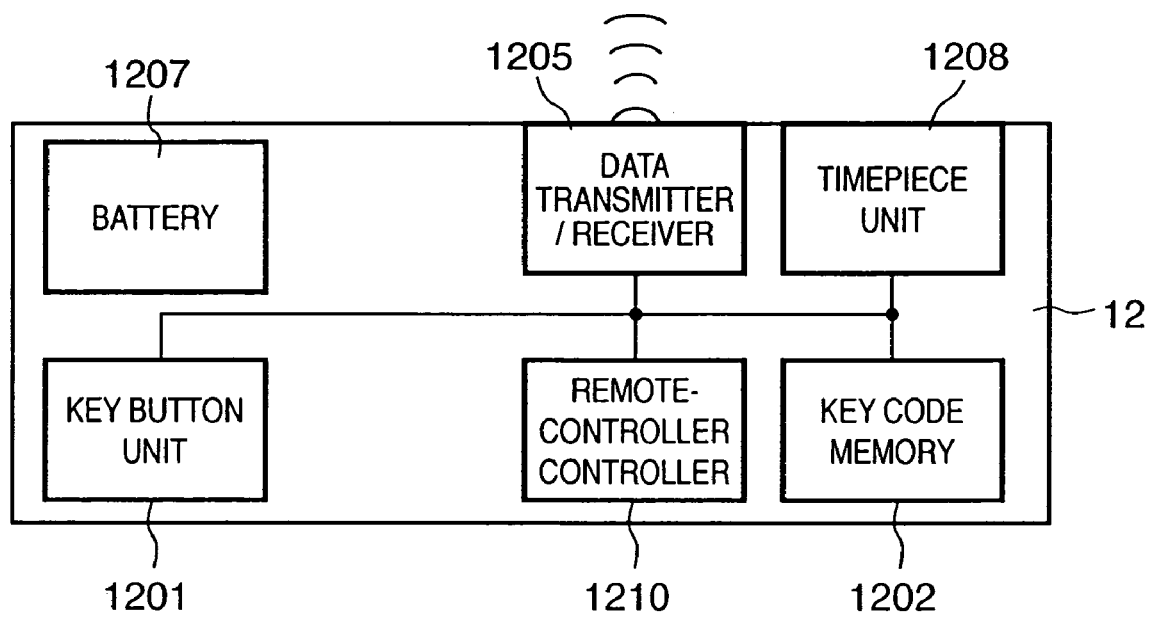
FIG. 3 is a block diagram showing the detailed arrangement of a remote controller 12 according to the first embodiment of the present invention.

FIG. 3 is a block diagram showing the detailed arrangement of the remote controller 12 according to the first embodiment of the present invention.

As shown in FIG. 3, reference numeral 1201 denotes a key button unit. The user of the remote controller 12 presses one of buttons of the key button unit 1201 to make the television apparatus 11 perform a required operation. The key button unit 1201 is controlled by a remote-controller controller 1210. Reference numeral 1202 denotes a key code memory.

The key code memory 1202 comprises a ROM or the like which pre-stores key codes and the like used to make television operations and setups.

Reference numeral 1205 denotes a data transmitter/receiver, which transmits various data such as key codes of pressed buttons, and the like to the remote-controller controller 1140 in the television apparatus 11.

Reference numeral 1207 denotes a battery which supplies electric power required to operate the remote controller 12. Reference numeral 1208 denotes a timer which measures the year, month, day, day of the week, time, and the like. The remote-controller controller 1210 detects operations at the key button unit 1201 and pressed keys, and controls the aforementioned units on the basis of key codes corresponding to the pressed keys.

That is, the remote control device (e.g., the remote controller 12) according to this embodiment is used to designate a plurality of programs, details of which are to be displayed, with respect to a display device (e.g., the television apparatus 11) that displays an EPG. For this purpose, the conditions for programs, details of which are to be simultaneously displayed, are designated from the EPG displayed on the screen of the television apparatus 11. Next, a program, details of which are to be displayed, is designated from those which match the designated conditions and are displayed simultaneously.

The remote control device (e.g., the remote controller 12) according to this embodiment designates the next select direction from the display position of the currently displayed detailed program information of a plurality of pieces of detailed program information, which are simultaneously displayed on the screen of the display apparatus (e.g., the television apparatus 11), and designates a program which is displayed at the closest position in the designated direction as a program, details of which are to be displayed. Note that the detailed operation sequence, and the like of the remote control device (e.g., the remote controller 12) according to this embodiment will be explained later.

Figure 4:
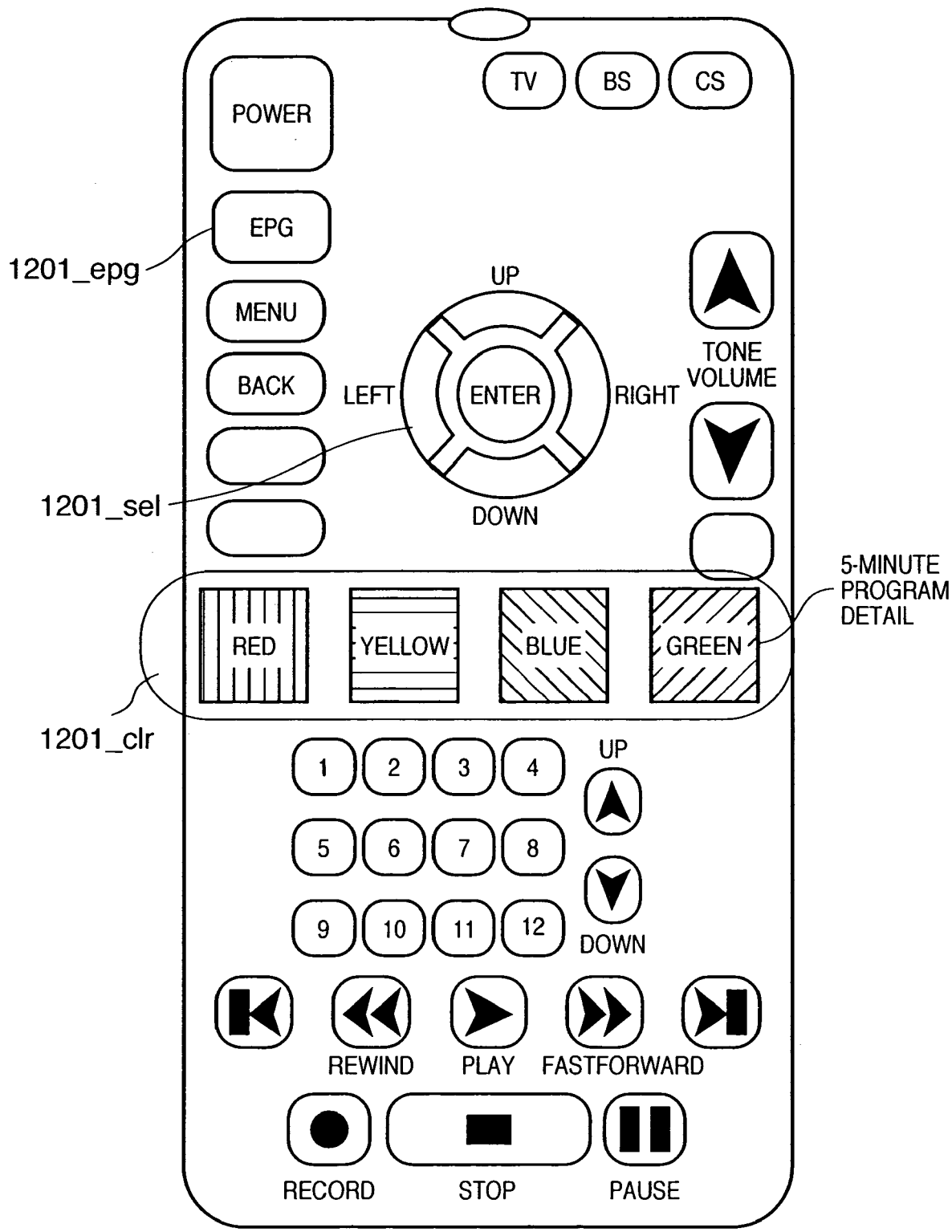
FIG. 4 shows the outer appearance of the remote controller 12 according to the first embodiment of the present invention.
Figure 6:
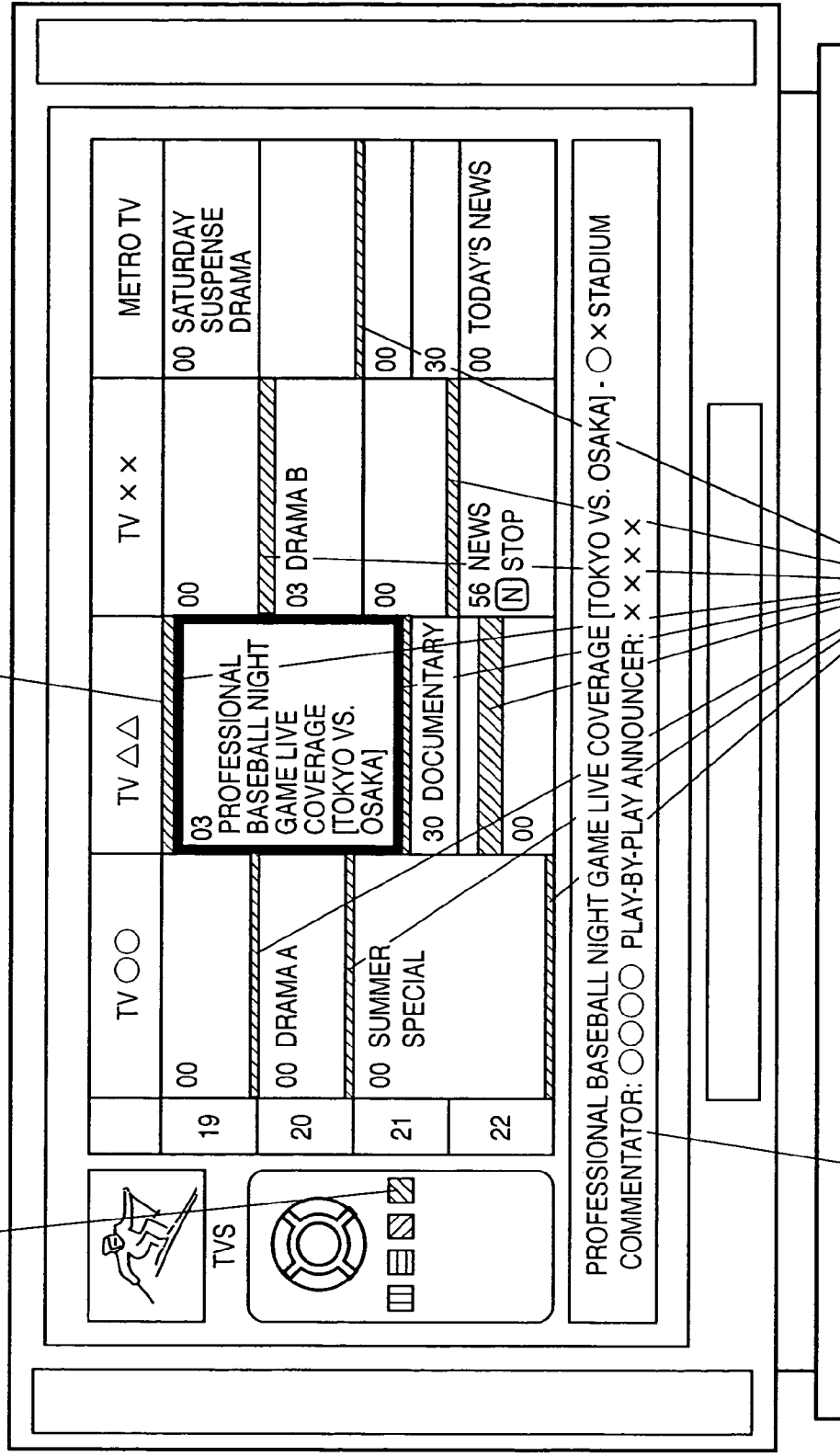
FIG. 6 shows a display example of an EPG window in the first embodiment of the present invention.

FIG. 4 shows the outer appearance of the remote controller 12 according to the first embodiment of the present invention. Referring to FIG. 4, reference numeral 1201_epg denotes an EPG display key. Upon depression of this key, an EPG shown in FIG. 6 is displayed on the screen of the television apparatus 11. Reference numeral 1201_sel denotes operation keys which include right, left, up, and down cursor keys, and an enter key, and are used in a menu operation and EPG operation.

Reference numeral 1201_clr denotes so-called color keys. On this remote controller, four color buttons, i.e., red, yellow, blue, and green buttons are prepared, and are used to assign a specific function in a menu operation or EPG window operation. For example, in this embodiment, the red, yellow, and green keys are respectively assigned as a yesterday's EPG display key, tomorrow's EPG display key, and 5-minute detail key. Note that the present invention is not limited to such specific key assignment.

As shown in FIG. 4, the remote controller 12 has, as other keys, a power key used to turn on/off the power supply of the apparatus main body, and keys used to select BS broadcast, CS broadcast, and input of an external apparatus such as a VTR or the like. Furthermore, the remote controller 12 has a menu key used to display an operation menu window, volume UP and DOWN keys used to increase/decrease the tone volume, numeric keys used to set, e.g., a television channel, channel UP and DOWN keys used to UP/DOWN a television channel, operation keys of the external apparatus, and the like.

Figure 5:
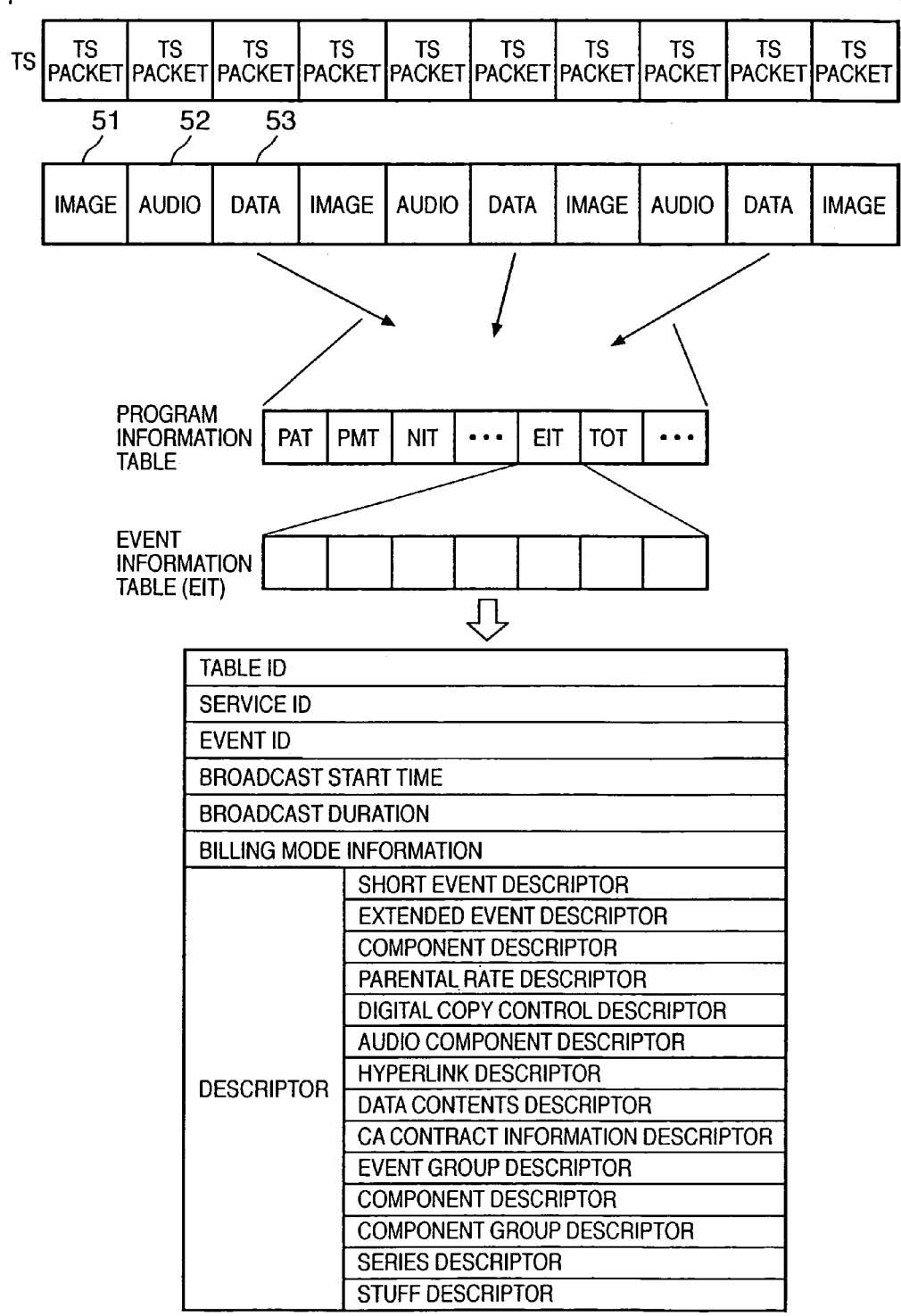
FIG. 5 shows an example of the configuration of a digital broadcast wave and EPG data received in this first embodiment of the present invention.

FIG. 5 shows an example of the configuration of a digital broadcast wave and EPG data received in this embodiment. As shown in FIG. 5, a digital broadcast signal is specified by various standards and standard groups such as IEC, IEEE, ARIB (Association of Radio Industries and Businesses), and the like, and is called a TS signal, which is formed of Video fields 51 that store a moving image signal, audio fields 52 that store an audio signal, and data fields 53 that store other data signals.

By collecting the data fields 53, various tables associated with information unique to broadcast programs such as PAT, PMT, NIT, EIT, TOT, and the like, i.e., program information tables are reconstructed, as shown in FIG. 5. EPG data used in this embodiment is described as some items and descriptors in the EIT (event information table) of these tables. Some first fields of the event information table describe the broadcast start time, broadcast duration, and the like of a program in addition to the table ID, service ID, event ID, and the like. After these fields, some descriptors are stored. Of these descriptors, those which are associated with the EPG according to this embodiment will be explained.

A short event descriptor describes the program title (within 80 bytes) and sub-title (within 160 bytes) of a program. An extended event descriptor describes character names of casts, scenario writer, presenter, and the like, comments of a program, and the like. A component descriptor describes the genre of a broadcast program. As genres of broadcast programs, major genres such as "news", "sports", "drama", "movie", "variety", "culture", and the like, and sub-genres for each major genre (e.g., "soccer", "baseball", "Olympic", and the like as sub-genres of "sports") are specified.

A parental rate descriptor describes a limited age for viewing. A digital copy control descriptor describes restriction information associated with digital and analog copies. A data content descriptor describes information associated with program-related data broadcast. A CA contract information descriptor describes information of availability of viewing, timer recording, and the like of a pay program. An event group descriptor describes event sharing, grouping information, and link information of event relays. A component descriptor describes combination information of components in an event for, e.g., a multi-view television or the like. A series descriptor describes information of a series program, re-broadcast, and the like.

As described above, in the television apparatus 11 according to this embodiment, the antenna 1101 and tuner 1102 receive a broadcast wave, and the decoder 1103 extracts only data fields from the broadcast wave and outputs them onto the internal bus 1180. The controller 1190 reconstructs the EIT using the data output onto the internal bus 1180, and stores data in the above format on the memory 1150 as EPG data. The controller 1190 reads out the EPG data from the memory 1150 in response to a request from the remote controller 12 by the television viewer, generates an EPG image together with EPG display image data stored in the data ROM 1160, and displays the image on the display unit 1122 via the image controller 1121.

Figure 9:
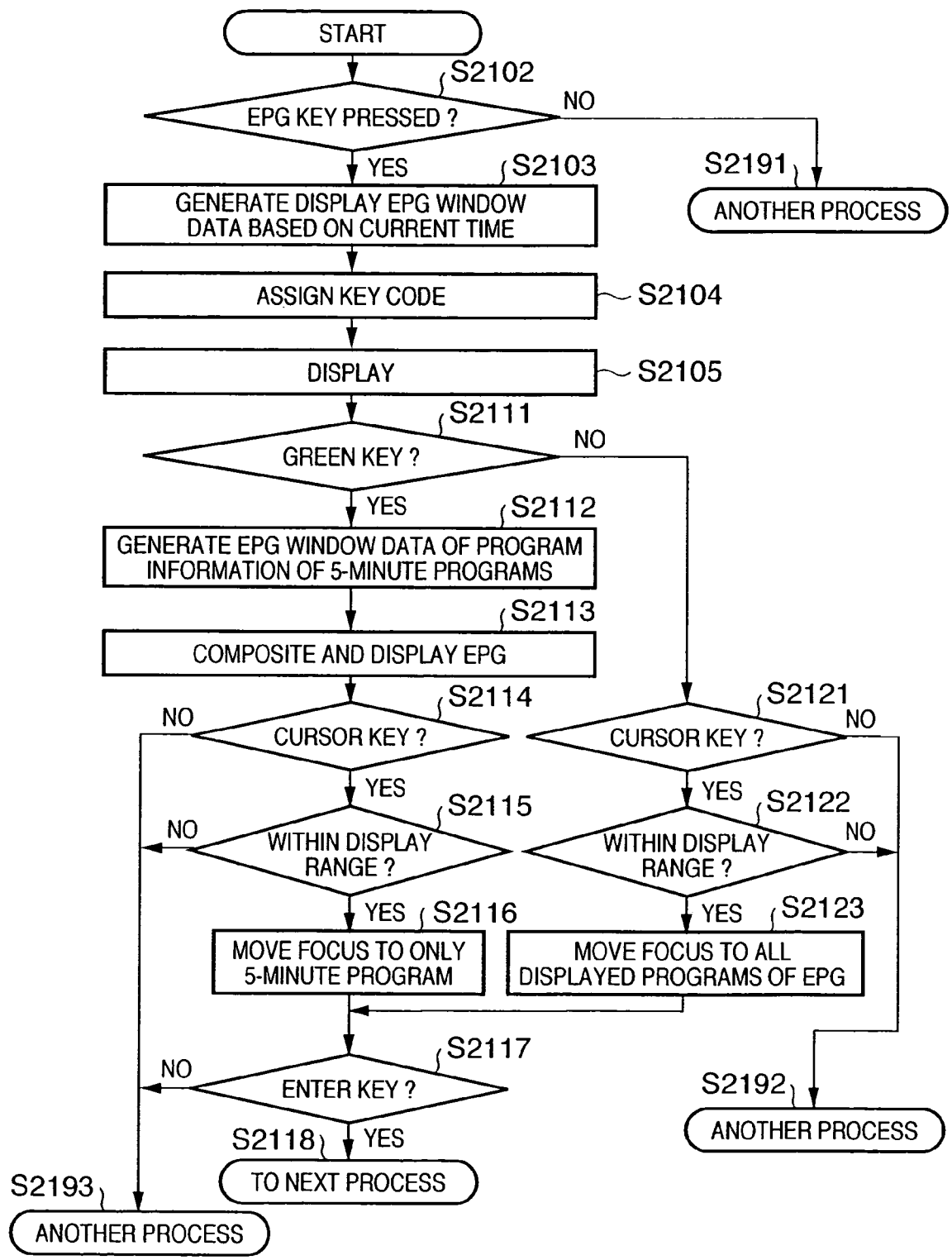
FIG. 9 is a flow chart for explaining the sequence for implementing EPG display on the television apparatus 11 according to the first embodiment of the present invention.

The operation sequences of the television apparatus 11 and remote controller 12 with the above arrangements according to this embodiment will be described below. FIG. 9 is a flow chart for explaining the sequence for implementing EPG display on the television apparatus 11 according to the first embodiment of the present invention.

Note that the television apparatus 11 receives a broadcast wave while its power supply is ON, extracts EPG data from that broadcast wave, and stores the EPG data in the memory 1150, as described above, prior to the following process.

When the television viewer browses the EPG while watching television broadcast, he or she presses the EPG display key 1201_epg of the remote controller 12 toward the television apparatus 11. With this operation, the data transmitter/receiver 1205 of the remote controller 12 transmits an EPG signal, and the remote-controller controller 1140 of the television apparatus 11 receives this signal.

In the television apparatus 11, it is checked if the viewer has pressed the EPG display key 1201_epg of the remote controller 12, and the remote-controller controller 1140 detects reception of an EPG signal (S2102). This checking process is executed by the controller 1190. As a result, if depression of that key is detected, the controller 1190 reads EPG data for four channels and four hours corresponding to the current date and time in the controller 1190 from the memory 1150, and generates EPG image data together with EPG display image data in the data ROM 1160. In this case, the controller 1190 detects programs within 5 minutes included in the readout EPG data, and generates the EPG image data so that the detected programs are displayed as "color stripes" using one of a plurality of colors determined for respective types or the like (a predetermined color or specific color) (S2103).

Next, the controller 1190 assigns remote-controller keys used in the EPG, and generates an instruction panel image of these keys. In the EPG window operation of this embodiment, the enter key of the operation keys 1201_sel and color keys 1201_clr are used, and are assigned (step S2104). Note that the cursor keys are used to move a focus of a program displayed on the EPG window, and the enter key is used to start subsequent operations such as viewing programming, timer recording, and the like of that program. On the other hand, the red and yellow keys of the color keys are respectively assigned as yesterday's EPG and tomorrow's EPG display keys, and the green key is assigned as a 5-minute detail key. Note that such key assignment is merely an example, and the present invention is not limited to the specific key assignment. That is, the program information display control apparatus (e.g., the television apparatus 11) according to this embodiment is characterized in that a program, details of which are to be displayed, is a brief program whose broadcast duration is within 5 minutes.

As a result, an EPG window shown in FIG. 6 is displayed on the display unit 1122 of the television apparatus 11 (step S2105). FIG. 6 shows a display example of the EPG window in the first embodiment of the present invention. Note that the EPG image shown in FIG. 6 is a display example of programs for four channels and four hours. Also, brief programs within 5 minutes (to be referred to as "5-minute programs" hereinafter) are displayed as only "color stripes".

Referring to FIG. 6, a frame in the lower portion of the window is a detail window used to display details of a focused program on the EPG. Also, a window of a channel which is watched so far is displayed on the upper left portion, and instructions for the respective operation keys on the remote controller 12 used to operate the EPG window are displayed below that window.

When the television viewer wants to know the contents of an arbitrary 5-minute program, he or she presses the green key, i.e., the 5-minute detail key, on the remote controller 12. In the television apparatus 11, the controller 1190 determines via the remote-controller controller 1140 whether or not the remote-controller controller 1140 detects depression of that key (step S2111). As a result, if it is determined that depression of the key is detected, the television apparatus 11 generates a 5-minute program simultaneous display image that superimposes program titles in the vicinities of the corresponding color stripes within the hours and channels of the currently displayed EPG window, on the basis of EPG data of 5-minute programs of the displayed EPG data (step S2112). The generated image is composited and displayed on the EPG window via the image controller 1121 (step S2113).

As a result, a composite EPG window on which the titles of 5-minute programs, which are merely displayed as color stripes in FIG. 6, are simultaneously displayed, is displayed, as shown in FIG. 7. FIG. 7 shows an example of a composite EPG window upon simultaneously displaying 5-minute program titles on the television apparatus 11 according to this embodiment. That is, the program information display control apparatus (e.g., the television apparatus 11) according to this embodiment is characterized in that the image controller 1121 displays detailed program information within the display range based on channel information and time band information of the EPG displayed on the display unit 1122. Also, the apparatus is characterized in that the detailed program information is displayed as a popup on the normal EPG.

The viewer presses one of the cursor keys of the operation keys 1201_sel on the remote controller 12 on the window in this state. FIGS. 8A and 8B show examples of transition of a focus upon operation of the cursor keys on the composite EPG window that simultaneously displays the 5-minute program titles. That is, the television apparatus 11 side detects if the cursor key has been pressed (step S2114), as described above. If the cursor key has been pressed (YES in step S2114), and if the current focus is not located on a 5-minute program, as indicated by reference numeral 81 in FIG. 8A, the focus moves to a 5-minute program, which is closest to the current focus position in the direction of the pressed cursor key (to the right closest 5-minute program if the right cursor key has been pressed, as indicated by reference numeral 82).

In this way, the focus moves to a 5-minute program closest to the currently focused program in the direction of the pressed cursor key (step S2116). For example, upon depression of the down cursor key, the focus position moves to the lower closest 5-minute program, as indicated by reference numeral 83. Also, upon depression of the left cursor key, the focus position moves to the left closest 5-minute program, as indicated by reference numeral 84. Furthermore, upon depression of the left cursor key once again, the focus position moves to the next left closest 5-minute program, as indicated by reference numeral 85 (that is, the focus transits).

In this manner, the focus can be moved to only target 5-minute programs, and their detailed contents can be displayed on the detail display window in the lower portion of the television screen. That is, the program information display apparatus (e.g., the television apparatus 11) according to this embodiment is characterized in that a program, details of which are to be displayed, is a program, text information of which is not displayed upon displaying a normal EPG (e.g., brief programs, which have broadcast durations within 5 minutes).

If it is determined in step S2114 that the viewer has not pressed any cursor key (NO in step S2114), another process is executed (step S2193). If it is determined in step S2114 that the viewer has pressed the cursor key, it is checked if a program as a destination of the focus falls within the current EPG display range prior to focus movement (step S2115). If that program falls within the display range (YES in step S2115), the focus is moved in step S2116. On the other hand, if it is determined that the program falls outside the display range (NO in step S2115), another process is executed (step S2193).

After focus movement in step S2116, it is checked if the viewer has pressed the enter key (step S2117). As a result, if the viewer has pressed the enter key (YES in step S2117), the next process for displaying the corresponding program is executed (step S2118). On the other hand, if the viewer has not pressed the enter key (NO in step S2117), another process is executed (step S2193).

After these processes, if the viewer wants to revert to the normal EPG display, he or she can press the green key (5-minute detail key) to revert to the EPG window in FIG. 6 (that is, 5-minute programs are displayed as color stripes).

If it is determined in step S2111 that the viewer has not pressed the green key (NO in step S2111), it is checked if the viewer has pressed one of the cursor keys (step S2121). As a result, if the viewer has pressed one of the cursor keys (YES in step S2121), it is checked if the moving destination of the focus falls within the display range of the currently displayed EPG (step S2122). If the destination falls within the display range, the focus moves to not only to a 5-minute program but also to each of all programs by the aforementioned method (step S2123). The flow then advances to step S2117.

If it is determined in step S2121 that the viewer has not pressed any cursor key, and if it is determined in step S2122 that the destination falls outside the display range, another process is executed (step S2192). In the description of the above embodiment, program information is that of a program which is broadcasted via wireless communications, but may be that of a program which is broadcasted via wired communications.

Second Embodiment

As the second embodiment, an embodiment that uses a display device with a touch panel as a remote controller, and displays operation buttons on the touch panel to display the contents on the basis of a genre and time will be described below.

Figure 10:
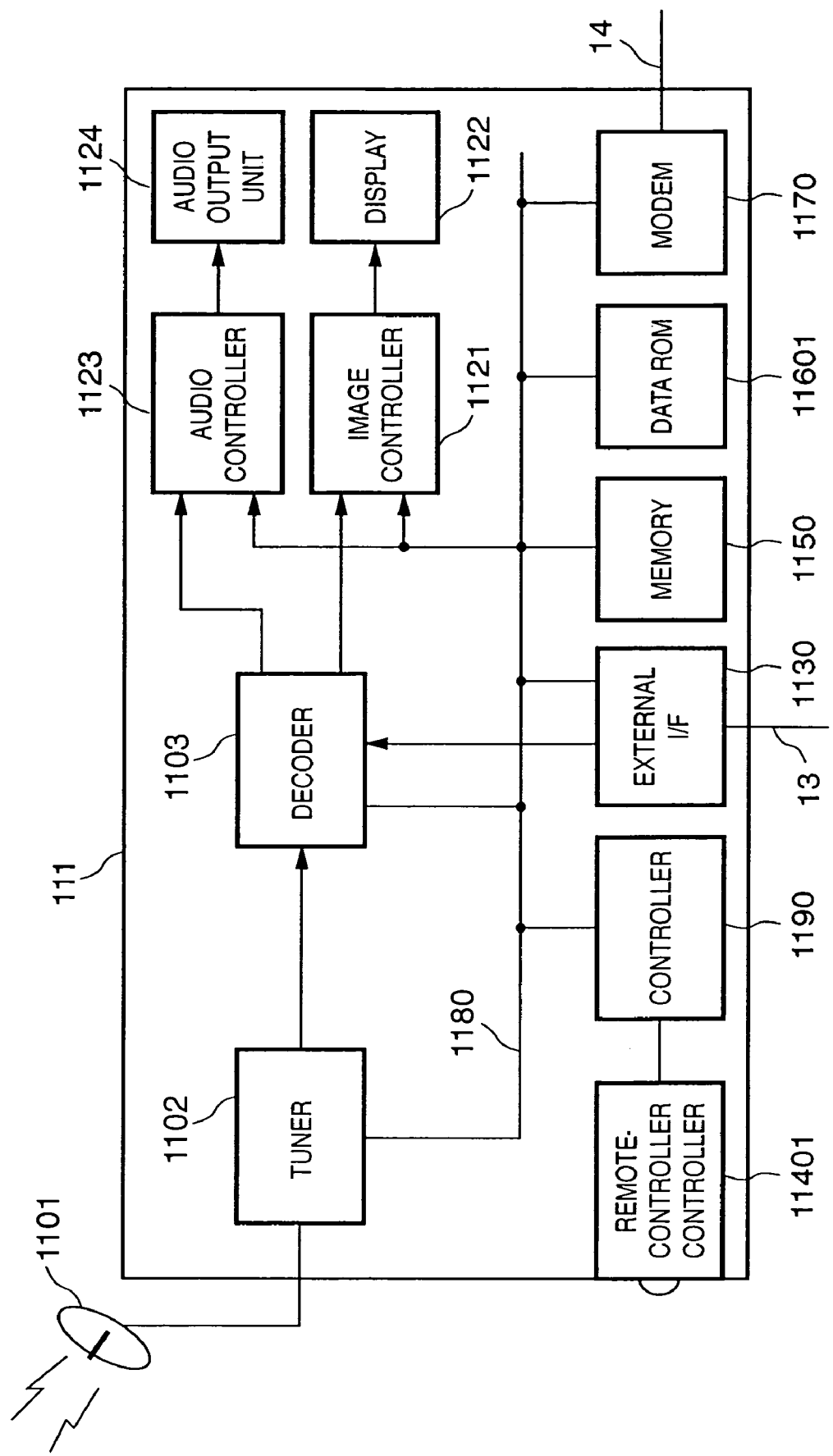
FIG. 10 is a block diagram showing the detailed arrangement of a television apparatus 111 according to the second embodiment of the present invention.

Note that the diagram of the overall system is the same as that shown in FIG. 1 described in the first embodiment. FIG. 10 is a block diagram showing the detailed arrangement of a television apparatus 111 according to the second embodiment of the present invention. The television apparatus 111 is different from the television apparatus 11 of the first embodiment in that a data ROM 11601 stores display data of a program title simultaneous display/select control panel to be displayed on a remote controller 121 (to be described later) of the second embodiment, and a remote-controller controller 11401 comprises a transmission/reception function that can transmit data to the remote controller 121 in place of the reception function.

A controller 1190 interprets key code data received by the remote-controller controller 11401, and position information data on a touch panel 1006 of the remote controller 121 (to be described later), and executes processes corresponding to these data.

Furthermore, the remote-controller controller 11401 of the television apparatus 111 transmits display data of a program detail simultaneous display control panel to the touch panel 1006 of the remote controller 121. Also, the remote-controller controller 11401 transmits various control data and display data in accordance with an internal status change of the television apparatus 111, broadcast reception data, information from an external I/F 1130 and modem 1170, and the like.

Figure 11:
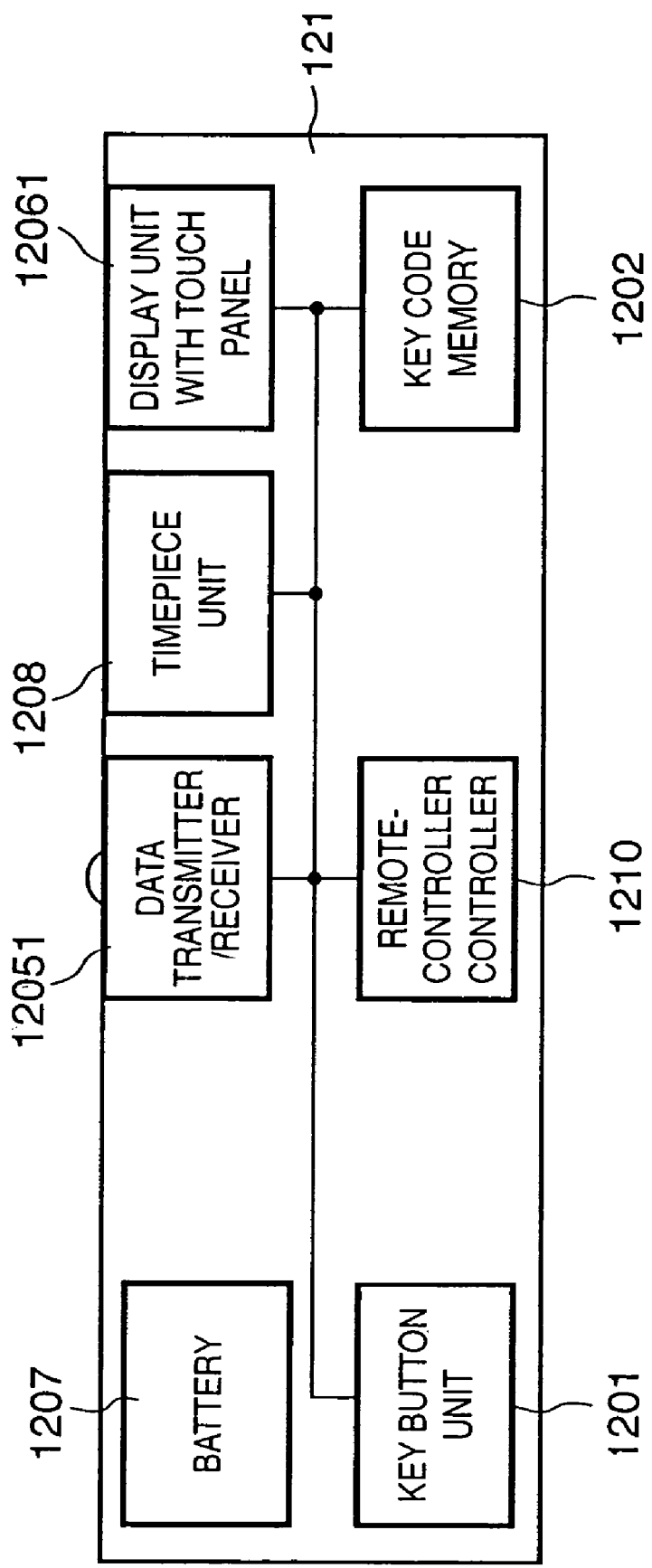
FIG. 11 is a block diagram showing the detailed arrangement of a remote controller 121 according to the second embodiment of the present invention.
Figure 12:
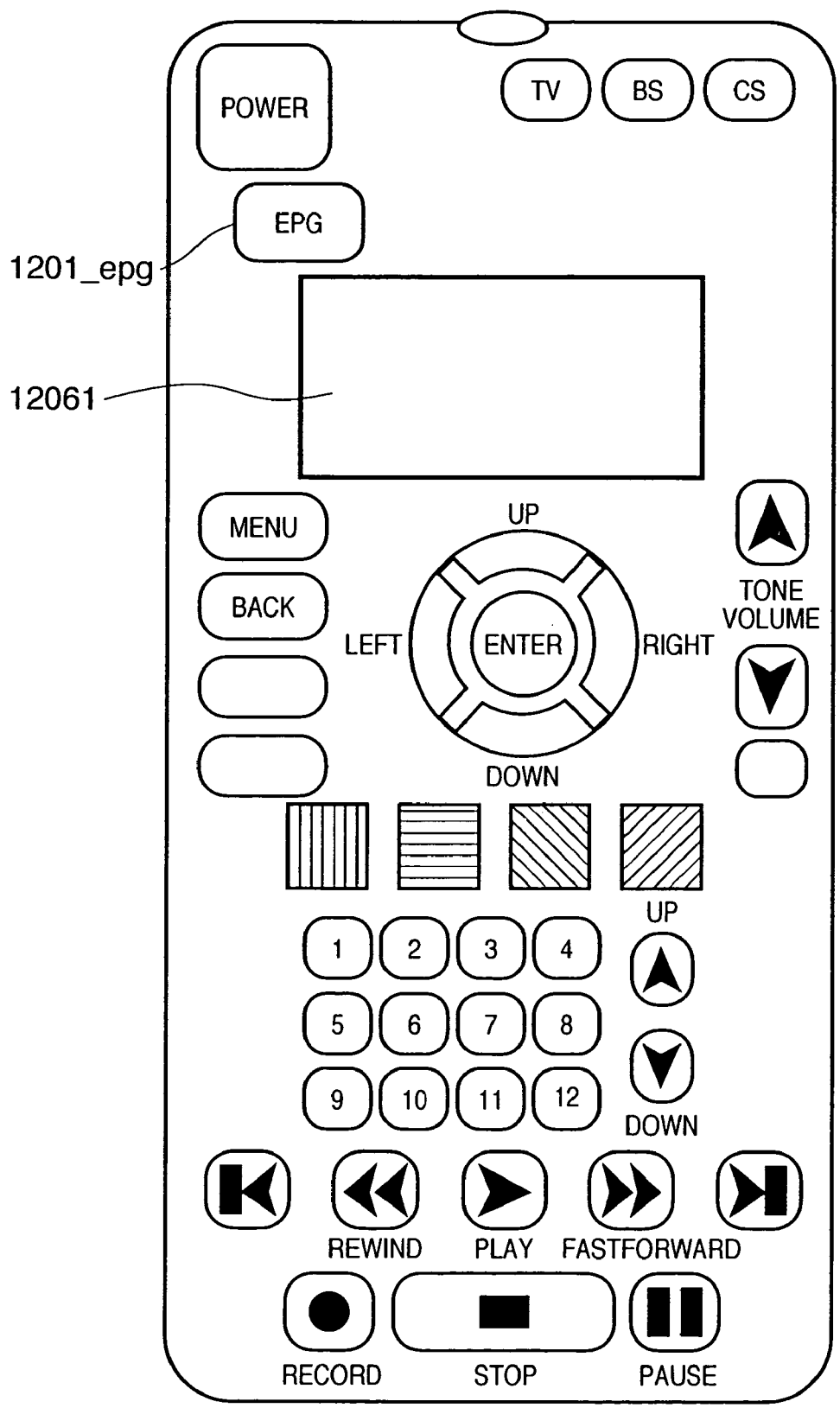
FIG. 12 shows the outer appearance of the remote controller 121 according to the second embodiment of the present invention.

FIG. 11 is a block diagram showing the arrangement of the remote controller 121 according to the second embodiment of the present invention. FIG. 12 shows the outer appearance of the remote controller 121 of this embodiment. The remote controller 121 of this embodiment comprises a display unit 12061 with a touch panel in addition to the arrangement of the remote controller 12 of the first embodiment. The display unit 12061 with the touch panel has a structure prepared by adhering a transparent touch panel to a general liquid crystal panel.

Figure 13:
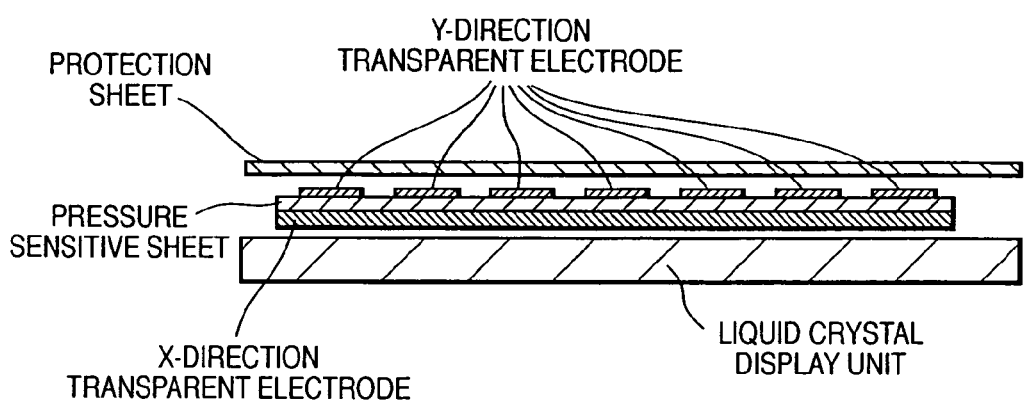
FIG. 13 is a sectional view showing the detailed structure of a touch panel of the remote controller 121 according to the second embodiment of the present invention.

FIG. 13 is a sectional view showing the detailed structure of the touch panel of the remote controller 121 according to the second embodiment of the present invention. As shown in FIG. 13, this structure is roughly divided into two, upper and lower portions. The lower half corresponds to a liquid crystal display, and the upper half portion has transparent electrodes which run in the X- and Y-directions and sandwich a pressure sensitive sheet between them to detect a position upon touching a given position with a finger or the like. In this embodiment, the display unit 12061 with the touch panel is used to display various menus, a control panel, a clock, and the like for various setups and operations of the television apparatus 111. Also, the display unit 12061 displays information such as a control panel, icon images, a message, and the like transmitted from the television apparatus 111.

When the viewer touches, with his or her finger, the surface of the touch panel with the above structure (from above a protection sheet, as shown in FIG. 13), the touched position is detected via X- and Y-electrodes upon scanning the keyboard of the remote-controller controller 1210. A data transmitter/receiver 12051 can transmit various data such as pressed key codes and the like to the remote-controller controller 1140 in the television apparatus 111, and can receive data such as control panel data and the like from the television apparatus 111. Other units are the same as those of the remote controller 12 of the first embodiment.

Figure 14:
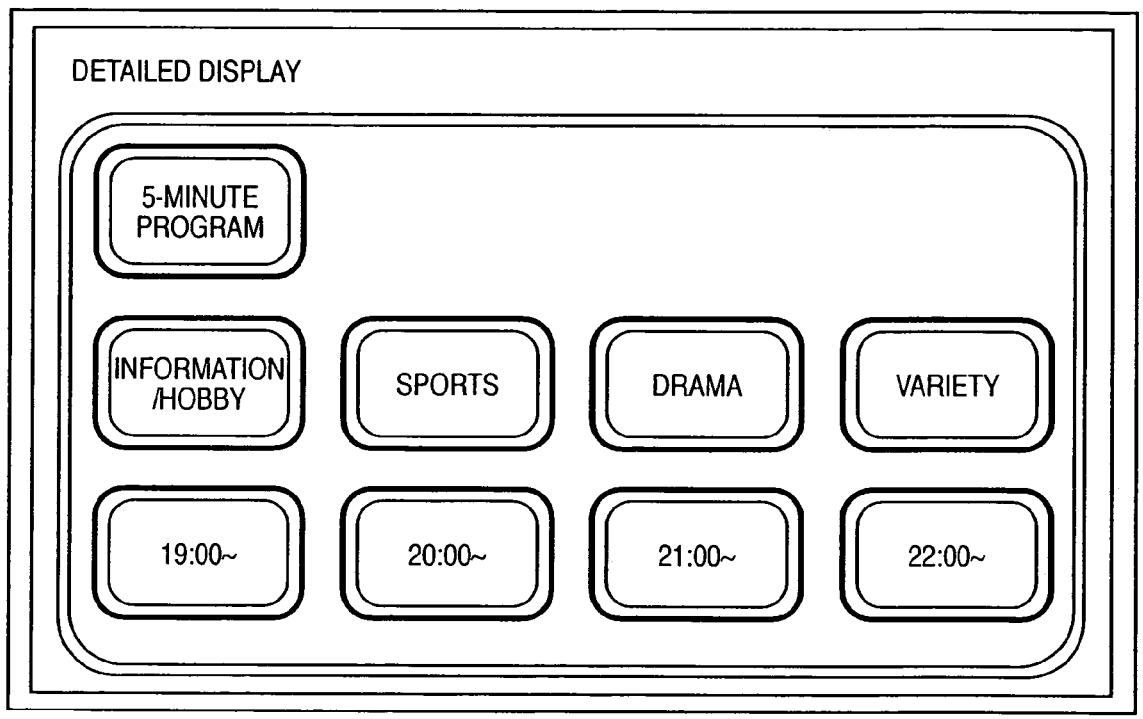
FIG. 14 shows an EPG details simultaneous display/select control panel displayed on a display unit 12061 with the touch panel of the remote controller 121 according to the second embodiment.

FIG. 14 shows an EPG detail simultaneous display/select control panel displayed on the display unit 12061 with the touch panel of the remote controller 121 according to this embodiment. This detail simultaneous display/select control panel is stored in the data ROM 11601 in the television apparatus 111. FIG. 15 shows an example of the EPG display window on the television apparatus 111 upon depression of a "drama" button on the EPG detail simultaneous display/select control panel.

That is, in the program information display control apparatus (e.g., the television apparatus 111) according to this embodiment, programs, details of which are to be displayed, may be those which are classified depending on genres. Also, programs, details of which are to be displayed, may be those which are classified depending on their broadcast time bands.

The detailed operation sequences of the television apparatus 111 and remote controller 121 according to the second embodiment of the present invention will be described below. FIG. 17 is a flow chart for explaining the detailed operation of the television apparatus 111 according to the second embodiment of the present invention. FIG. 16 shows an example of focus transition upon operation of the cursor keys on the composite EPG window that simultaneously displays "drama" programs.

In the television apparatus 111, as described above, a broadcast wave is received while its power supply is ON, EPG data is extracted from that broadcast wave, and the EPG data is stored in the memory 1150.

When the television viewer browses the EPG while watching television broadcast, he or she presses the EPG display key 1201_epg of the remote controller 121 toward the television apparatus 111. With this operation, the data transmitter/receiver 12051 of the remote controller 121 transmits an EPG signal.

In the television apparatus 111, it is checked if the remote-controller controller 1140 detects depression of the EPG key of the remote controller 121 (S5102). Upon detection of depression of this key, the controller 1190 reads EPG data for four channels and four hours corresponding to the current date and time in the controller 1190 from the memory 11501, and generates EPG image data together with EPG display image data in the data ROM 11601 (step S5103). Then, the controller 1190 displays the EPG data on the display unit 1122, i.e., the television screen, via the image controller 1121 (step S5104). In this case, the controller 1190 detects programs within 5 minutes included in the readout EPG data, and generates the EPG image data so that the detected programs are displayed as "color stripes" as in the first embodiment.

Next, the controller 1190 assigns remote-controller keys used in the EPG, and generates an instruction panel image of these keys (step S5105). In the EPG window operation of this embodiment, the operation keys 1201_sel (cursor keys and enter key) and color keys 1201_clr are used, and are assigned.

Note that the cursor keys are used to move a focus of a program displayed on the EPG window, and the enter key is used to start subsequent operations such as viewing programming, timer recording, and the like of that program. On the other hand, the red and yellow keys of the color keys are respectively assigned as yesterday's EPG and tomorrow's EPG display keys.

As a result, the window shown in FIG. 6 is displayed as in the first embodiment. The EPG image for four channels and four hours as an example of time band are displayed. Also, brief programs within 5 minutes are displayed as only "color stripes".

The controller 1190 reads out EPG simultaneous display/select control panel data from the data ROM 11601, and transmits that data via the remote-controller controller 11401 (step S5106). The remote controller 121 receives the control panel data via the data transmitter/receiver 12051, and displays the control panel on the display unit 12061 with the touch panel, as shown in FIG. 14. After that, when the viewer wants to know details of a given drama program, he or she presses a portion corresponding to the "drama" button on the display unit 12061 with the touch panel with his or her finger or the like.

In the television apparatus 111, it is determined whether or not the remote-controller controller 11401 receives touch panel position information from the remote controller 121 (step S5111). As a result, if the touch panel position information is received (YES in step S5111), the controller 1190 detects based on the received position information that the pressed touch panel position of the remote controller corresponds to the "drama" button (step S5112).

The television apparatus 111 searches the displayed EPG data for those of programs whose genre is "drama" (step S5113). The television apparatus 111 then generates a drama program simultaneous display image which superimposes program titles, sub-titles, and the contents of their extended event fields on the corresponding programs within the range of the hours and channels on the currently displayed EPG window, and composites and displays it via the image controller 1121 (step S5114).

As a result, a composite EPG window that simultaneously displays the contents of the drama programs is displayed, as shown in FIG. 15. In this case, the composite window is displayed by overwriting the content simultaneous EPG display on the normal EPG display, so that it is displayed to be observable at the top position irrespective of the focus position. Note that the same applies to other genres.

In this state, when the viewer has pressed one of the cursor keys on the remote controller 121, the television apparatus 111 similarly detects it (step S5121). It is checked if the moving destination of the focus falls within the display range of the EPG window (step S5122). If the moving destination of the focus falls within the display range (YES in step S5122), the focus of a program is moved within the EPG window as in the first embodiment (step S5123). In this state, since the content simultaneous EPG display is overwritten on the normal EPG, as described above, the contents cannot be displayed at all even after cursor movement.

Hence, it is determined whether or not the content simultaneous EPG display is overwritten on the normal EPG display (step S5125). If the content simultaneous EPG display overlaps (YES in step S5125), the focused program is displayed at the top position, so that it can be observed (step S5126). On the other hand, if the content simultaneous EPG display does not overlap (NO in step S5125), the flow advances to the next process (step S5128). Note that the relationship between depression of the cursor keys and focus movement on the EPG window in this embodiment is the same as that in the first embodiment, as shown in FIG. 16.

If it is determined in step S5102 that the EPG key has not been pressed, if it is determined in step S5111 that control panel position information is not received, if it is determined in step S5121 that none of the cursor keys have been pressed, and if the display request falls outside the current EPG display range even when one of the cursor keys has been pressed, another process is executed (step S5131).

With the above process, the contents of programs corresponding to an item displayed on the remote controller 121 are simultaneously displayed. That is, if the viewer has pressed a 5-minute program button, the contents of 5-minute programs can be simultaneously displayed as in the first embodiment.

Other Embodiments

Figure 18:
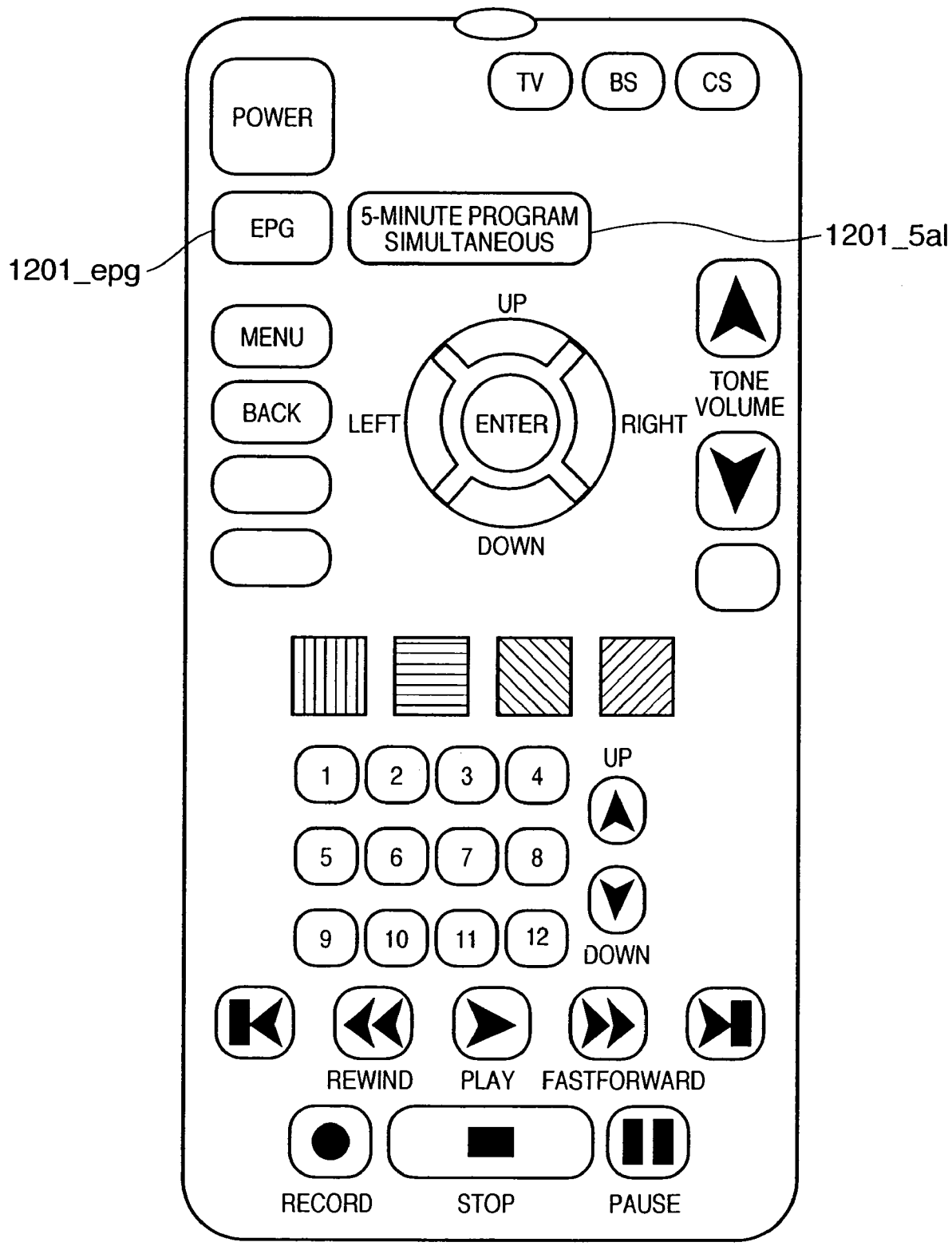
FIG. 18 shows the outer appearance of a remote controller which comprises a 5-minute program simultaneous display dedicated button 1201_5al.

In the first embodiment, one of the color buttons of the remote controller 12 is assigned as a 5-minute program simultaneous display key. Alternatively, a dedicated button 1201_5al may be provided to the remote controller, as shown in FIG. 18. That is, FIG. 18 shows the outer appearance of the remote controller which comprises the 5-minute program simultaneous display dedicated button 1201_5al.

In the second embodiment, categories used upon simultaneously displaying details of programs are "brief program", "genre", and "time band". In addition, for example, the viewer may input an arbitrary keyword, and when the keyword is contained in EPG data, corresponding programs may be simultaneously displayed. That is, the television apparatus (program information display control apparatus) according to this embodiment may further comprise means for acquiring a keyword used to search for programs, details of which are to be displayed, in addition to the arrangement of the aforementioned embodiments. Also, the apparatus may display details of programs, which include the acquired keyword in their detailed program information.

Figure 19:
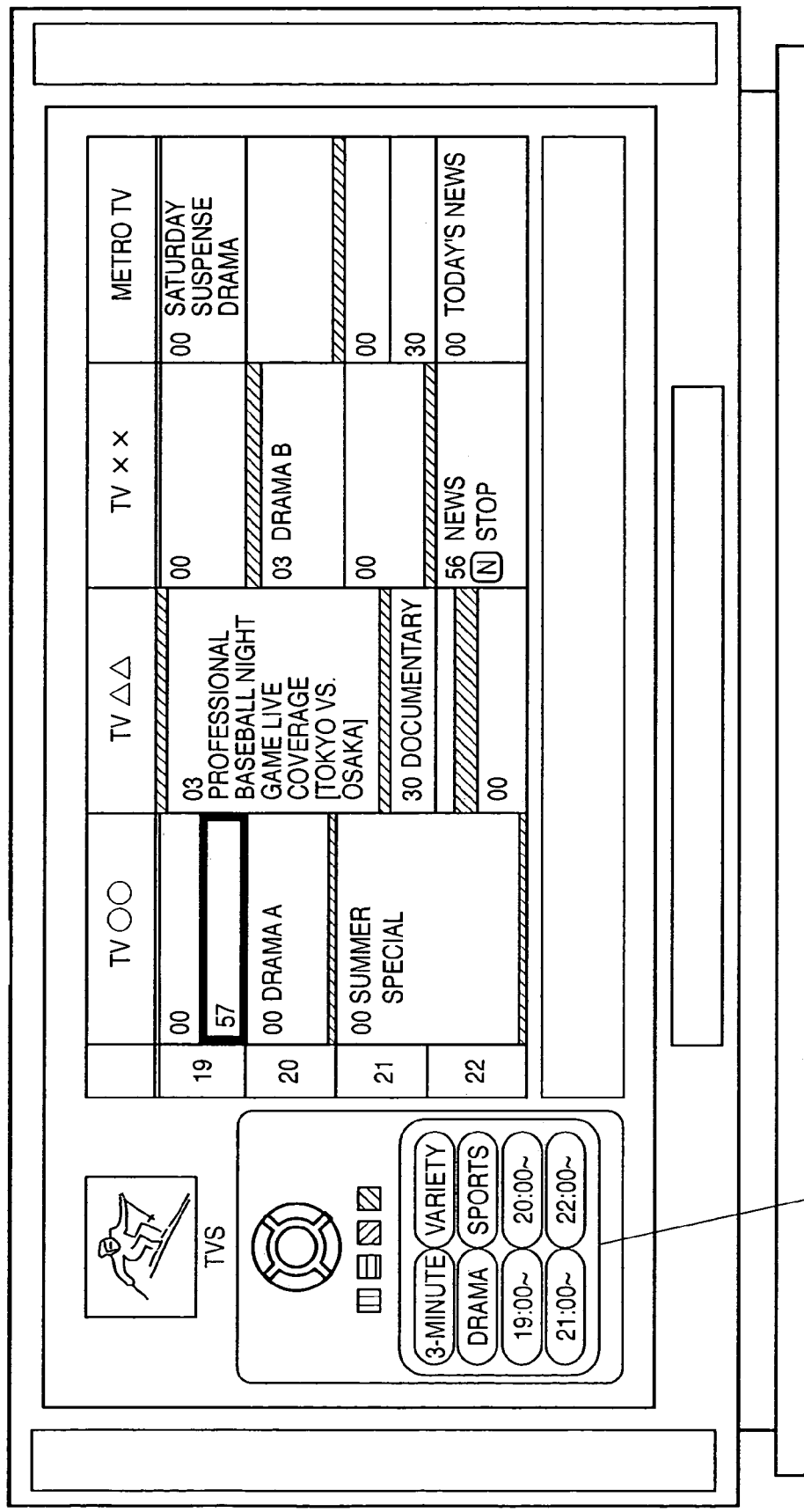
FIG. 19 shows an example of a screen display of a television apparatus provided with a control panel.

Furthermore, in the second embodiment, the operation buttons are displayed on the display unit 12061 with the touch panel of the remote controller 121. Alternatively, a control panel may be displayed on the television screen, as shown in FIG. 19, and may be operated using the remote controller. That is, FIG. 19 shows an example of the screen display of a television apparatus provided with a control panel.

Moreover, in the above two embodiments, when the 5-minute detail key is depressed again after program titles are simultaneously displayed, the screen display contents revert to the original EPG display. Alternatively, a "back" key or the like may be pressed to revert to the original EPG display.

In addition, if only 5-minute programs are to be displayed, a method of displaying these programs while the 5-minute detail key is held down, or a method of displaying these programs for a predetermined period of time after depression of the key may be used.

The EPG used in the above embodiment is generated based on the broadcast wave of digital broadcast. Also, the EPG may be generated using data acquired from a television guide on the Internet, a program guide service, and the like.

Using the EPG display system which comprises the television apparatus and remote controller according to the aforementioned embodiments, the viewer can select a program that he or she wants to select quicker than the conventional EPG by moving a focus within the range of specific programs which are displayed simultaneously.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As described above, according to the present invention, the contents and detailed information of specific programs that follow given rules such as a time band, genre, and the like can be simultaneously displayed while maintaining the number of channels, time band, and the like of programs to be simultaneously displayed to be equivalent to those of the conventional EPG.

As many apparently widely different embodiments of the present invention can be made without departing from the spirit and scope thereof, it is to be understood that the invention is not limited to the specific embodiments thereof except as defined in the appended claims.

What is claimed is:

1. A display control apparatus generating electronic program guide images with a matrix format area defined by broadcasting time and channel and displaying a generated electronic program guide image to a display unit, said display control apparatus comprising:
    an information acquisition unit configured to acquire program information associated with each of programs to be broadcasted;
    a controlling unit configured to generate first and second electronic program guide images using acquired program information, wherein each electronic program guide image is arranged as program information display areas for displaying program information of a respective plurality of programs corresponding to broadcasting time and channel in the matrix format area, and wherein the program information display areas of the first electronic program guide image display program name information corresponding to all programs of a broadcasting duration longer than a predetermined broadcasting duration and do not display program name information corresponding to all programs of a broadcasting duration less than or equal to the predetermined broadcasting duration, and the program information display areas of the second electronic program guide image display program name information corresponding to all programs of a broadcasting duration longer than a predetermined broadcasting duration and also display program name information corresponding to all programs of a broadcasting duration of less than or equal to the predetermined broadcasting duration, which are included in the matrix format area;
    an input unit configured to accept instruction input from a user for selecting which of the first electronic program guide image and the second electronic program guide image is to be displayed; and
    a display control unit configured to display either the first or the second electronic program guide image according to the instruction input.

2. A display control apparatus according to claim 1, wherein said controlling unit generates the first electronic program guide image which displays the program information display area corresponding to a program of less than or equal to the predetermined duration as a colored area such that existence of a program can be recognized.

3. A display control apparatus according to claim 1, further comprising:
    an operating unit configured to accept selection of a program placed on a program information display area in a displayed electronic program guide image from the user,
    wherein said controlling unit controls movement of a cursor, which indicates the currently selected program, among programs of less than or equal to the predetermined duration when the second electronic program guide image is displayed on the display unit.

4. A display control method of a display control apparatus generating electronic program guide images with a matrix format area defined by broadcasting time and channel and displaying a generated electronic program guide image to a display unit, said method comprising the steps of:
    acquiring program information associated with each of programs to be broadcasted;
    controlling first and second electronic program guide images using acquired program information, wherein each electronic program guide image is arranged as program information display areas for displaying program information of a respective plurality of programs corresponding to broadcasting time and channel in the matrix, and wherein the program information display areas of the first electronic program guide image display program name information corresponding to all programs of a broadcasting duration longer than a predetermined broadcasting duration and do not display program name information corresponding to all programs of a broadcasting duration less than or equal to the predetermined broadcasting duration, and the program information display areas of the second electronic program guide image display program name information corresponding to all programs of a broadcasting duration longer than a predetermined broadcasting duration and also display program name information corresponding to all programs of a broadcasting duration of less than or equal to the predetermined broadcasting duration, which are included in the matrix format area;
    an inputting step of accepting instruction input from a user for selecting which of the first electronic program guide image and the second electronic program guide image is to be displayed; and
    a display control step of displaying either the first or the second electronic program guide image according to the instruction input.

5. A display control method according to claim 4, wherein said step of controlling generates the first electronic program guide image which displays the program information display area corresponding to a program of less than or equal to the predetermined duration as a colored area such that existence of a program can be recognized.

6. A display control method according to claim 4, further comprising the step of:
    accepting selection of a program placed on a program information display area in a displayed electronic program guide image from the user,
    wherein said step of controlling controls movement of a cursor, which indicates the currently selected program, among programs of less than or equal to the predetermined duration when the second electronic program guide image is displayed.

* * * * *